United States Patent
Lakadamyali et al.

(10) Patent No.: US 11,287,628 B2
(45) Date of Patent: Mar. 29, 2022

(54) MULTI-COLOR IMAGING

(71) Applicants: FUNDACIO INSTITUT DE CIENCIES FOTONIQUES, Barcelona (ES); INSTITUCIO CATALANA DE RECERCA I ESTUDIS AVANCATS, Barcelona (ES)

(72) Inventors: Melike Lakadamyali, Philadelphia, PA (US); Maria Garcia Parajo, Barcelona (ES); Pablo Gomez, Salamanca (ES)

(73) Assignees: FUNDACIO INSTITUT DE CIENCIES FOTONIQUES, Barcelona (ES); INSTITUCIO CATALANA DE RECERCA I ESTUDIS AVANCATS, Barcelona (ES)

( * ) Notice: Subject to any disclaimer, the term of this patent is extended or adjusted under 35 U.S.C. 154(b) by 0 days.

(21) Appl. No.: 16/886,640

(22) Filed: May 28, 2020

(65) Prior Publication Data
US 2021/0373310 A1    Dec. 2, 2021

(51) Int. Cl.
G02B 21/00    (2006.01)
H04N 5/235    (2006.01)
G01N 21/64    (2006.01)
G02B 21/36    (2006.01)

(52) U.S. Cl.
CPC ......... *G02B 21/0076* (2013.01); *G01N 21/64* (2013.01); *G02B 21/008* (2013.01); *G02B 21/361* (2013.01); *H04N 5/2354* (2013.01)

(58) Field of Classification Search
CPC .............. G02B 21/0076; G02B 21/008; G02B 21/361; G01N 21/64; H04N 5/2354
See application file for complete search history.

(56) References Cited

U.S. PATENT DOCUMENTS

| | | | |
|---|---|---|---|
| 2013/0149734 A1* | 6/2013 | Ammar | A61B 3/0008 |
| | | | 435/29 |
| 2014/0340483 A1* | 11/2014 | Ritter | G02B 27/58 |
| | | | 348/46 |
| 2014/0367590 A1* | 12/2014 | Walla | G02B 21/16 |
| | | | 250/459.1 |
| 2017/0307440 A1 | 10/2017 | Urban et al. | |

OTHER PUBLICATIONS

European Patent Office, Office Action Issued in Application No. 18382879.7, dated Mar. 5, 2021, Germany, 7 pages.
(Continued)

*Primary Examiner* — Marcus H Taningco
(74) *Attorney, Agent, or Firm* — McCoy Russell LLP

(57) ABSTRACT

The disclosure relates to a method and an imaging device for multi-color imaging using frequency-modulated illumination. The method comprises a step of providing electromagnetic radiation with a plurality of different wavelengths, comprising a step of modulating each wavelength with a different modulation frequency, a step of illuminating a target with the modulated electromagnetic radiation, in particular for excitation of a target, a step of sensing electromagnetic radiation emitted from the target, in particular the luminescence, more in particular the fluorescence, and a step of processing the data obtained in the step of sensing.

21 Claims, 13 Drawing Sheets
(5 of 13 Drawing Sheet(s) Filed in Color)

(56) References Cited

OTHER PUBLICATIONS

Jungmann, R. et al., "Multiplexed 3D cellular super-resolution imaging with DNA-Paint and Exchange-Paint," Nature Methods, vol. 11, No. 3, Feb. 2, 2014, 10 pages.
Le, V. et al., "Frequency division multiplexed multi-color fluorescence system," Proceedings of vol. 10463, AOPC 2017: Space Optics and Earth Imaging and Space Navigation, Jun. 4, 2017, Beijing, China, 12 pages.
Garbacik, E. et al., "Frequency-Encoded Multicolor Fluorescence Imaging with Single-Photon-Counting Color-Blind Detection," Biophysical Journal, vol. 115, No. 4, Jul. 12, 2018, 12 pages.
Gomez-Garcia, P. et al., "Excitation-multiplexed multicolor super-resolution imaging with fm-Storm and fm-DNA-Paint," Proceedings of the National Academy of Sciences of the United States of America, vol. 151, No. 51, Dec. 3, 2018, 21 pages.
European Patent Office, Extended European Search Report Issued in Application No. 18382879.7, dated Feb. 11, 2019, Germany, 12 pages.

\* cited by examiner 576 (green)                              578 (magenta)

584 (green)            586 (magenta)         588 (green and magenta)

MULTI-COLOR IMAGING

TECHNICAL FIELD

The disclosure relates to a method for multi-color imaging and, more particularly, to a multi-color fluorescence methodology applied to single-molecule localization microscopy, in particular for super-resolution microscopy.

BACKGROUND AND SUMMARY

Recent advancements in single molecule based super-resolution microscopy have made it possible to visualize biological structures with unprecedented spatial resolution. Super-resolution microscopy based on single molecule localization relies on two main crucial elements. Firstly, individual fluorescent molecules can be imaged and their spatial coordinates can be localized and determined with very high precision, with nanometer accuracy. This can be performed as long as molecules are sparsely distributed on the sample surface, so that their point-spread-functions (PSF) do not spatially overlap. This can be done with high precision, so that these methods break the resolution limit barrier of conventional microscopy, reaching the order of tens of nanometers, compared to the hundreds of nanometers of conventional microscopy. Secondly, since biological structures contain hundreds of thousands molecules, they will spatially overlap and thus their coordinates cannot be determined.

For super-resolution microscopy to work, most of the molecules are placed in a "dark" state, i.e. they do not fluoresce, so that, at a given time, only a sub-set of molecules are allowed to fluoresce, i.e. being in a bright state, and their positions can be determined with nanometer accuracy. By repeating this process many times over thousands of different molecules, eventually all the positions of individual molecules are determined and their locations are collapsed in a final super-resolution image. The spatial resolution of these methods is well beyond the diffraction limit, which is typically around 300 nm for visible light, since the effective spatial resolution is given by the precision to identify individual molecules, i.e., nanometer scale.

Depending on how the switching from a bright (on-state) to a dark (off-state) is achieved, these single molecule localization methods receive different names: STORM: stochastic reconstruction microscopy, where the on-off switching is achieved by taking advantage of the photophysical properties of organic dyes, PALM: photoactivation localization microscopy, where the on-off switching is achieved by taking advantage of the photoconvertible or photoactivatable properties of autofluorescent properties, DNA-PAINT: where the on-off switching is achieved by the transient binding (on) and unbinding (off) of DNA-oligos to their counterpart oligos.

Determining the spatial co-organization of the biological structures within cells under physiological and pathological conditions is an important biological goal. For this, multi-color super-resolution microscopy is important for determining the relationship among the spatial distribution and sub-cellular localization of multiple proteins. However, existing multi-color implementations for super-resolution microscopy have important drawbacks including color cross-talk, unavailability of well-performing spectrally distinct photo-switchable fluorophores and long acquisition times.

One approach for multi-color super-resolution microscopy uses fluorophore pairs in which the same reporter is coupled to different activators. In this case, the color is determined based on the wavelength of the activation laser. Typically, a cycle of 3-4 camera frames is used in which a short pulse of activation laser light is followed by the imaging laser. In each cycle a different activation laser is used and the fluorophore localizations are color-coded based on which cycle the fluorophore turned on. This approach is free from chromatic aberrations since the same reporter dye is always used and the full camera field-of-view is maintained over multiple colors. However, this is a sequential imaging approach, in which the time investment scales with the number of colors needed. Moreover, it is prone to color cross-talk, since fluorophores can also undergo spontaneous blinking or can be activated by the "wrong" activation laser.

A second approach uses spectrally-distinct photo-switchable reporter dyes such that color cross-talk can be reduced or eliminated. However, there is a limited availability of spectrally distinct photo-switchable fluorophores with favorable photophysical properties. Last but not least, the camera field-of-view is often split into smaller sub-regions for simultaneous multi-color imaging, resulting in a reduced experimental throughput. Often, sequential imaging is preferred at the expense of increased acquisition time to minimize photobleaching. Another approach for reducing color cross-talk is the use of sequential labelling and imaging, which requires substantial time investment.

Another approach is based on spectrally-resolved multi-color super-resolution microscopy where the fluorescent molecules can be discriminated based on their emission spectra. However, such approach requires complex optical configuration of the microscope. In general, these spectrally resolved single-molecule approaches necessitate increasing molecular sparseness to avoid spatio-spectral overlapping, potentially extending the time needed to reconstruct a super-resolution image, or reducing the available field of view by separating a single imaging detector into multiple sections. Importantly, spectral fluctuations inherent to single molecules at room temperature and/or cellular environmental conditions can limit the applicability of spectrometer-resolved super-resolution approaches.

All these inconveniences combined together limit the practical application of multi-color super-resolution imaging in biology.

The object of the invention is therefore to overcome the drawbacks cited previously and in particular to provide a simplified experimental imaging device with a gain in imaging throughput and/or reduced color cross-talk and/or improved image acquisition time for multi-color imaging, in particular for multi-color single molecule imaging.

This object is solved by providing multi-color imaging using a multi-color fluorescence imaging methodology applied to single-molecule imaging in general and in particular to single molecule localization microscopy.

The object of the invention is achieved by a method for multi-color imaging using frequency-modulated illumination. The method can comprise a step of providing electromagnetic radiation with a plurality of different wavelengths, comprising a step of modulating each wavelength with a different modulation frequency, a step of illuminating a target with the modulated electromagnetic radiation, in particular for excitation of a target, a step of sensing electromagnetic radiation emitted from the target, in particular the luminescence, more in particular the fluorescence, and a step of processing the data obtained in the step of sensing. The step of modulating each wavelength of electromagnetic radiation with frequency can shift the measurements of fluorescence to the frequency domain, instead of the time domain used in state of the art techniques of fluorescence. Since individual fluorescence elements will emit fluorescence directly proportional to their absorption cross-section at a given excitation wavelength, by modulating different wavelengths of electromagnetic radiation, or excitation wavelengths, at distinct frequencies, fluorescence elements with different excitation spectra can be excited to a varying degree according to their absorption cross-section at each given excitation wavelength. In contrast to standard fluorescence detection, in which color discrimination is achieved based on spectral filtering of the emitted fluorescence, color discrimination can be based here on the absorption properties of the fluorescence elements and thus enables to eliminate the need of spectral filtering on detection. Thus, a higher signal throughput can be achieved compared to standard fluorescence techniques.

According to a variant of the disclosure, the step of illuminating can comprise simultaneously illuminating the target with the plurality of wavelengths of electromagnetic radiation. The target can comprise a plurality of different multiple fluorescence elements and thus a simultaneous illumination of the target with different wavelengths of electromagnetic radiation enables to illuminate simultaneously all the fluorescence elements present in the target.

According to a variant of the disclosure, the step of sensing can comprise sensing the intensity of the electromagnetic radiation emitted by the target independently of the wavelength of the electromagnetic radiation. Thus, a simultaneous identification of multiple color channels can be performed. This results in that the multiple color channels information can be obtained in the timeframe of a single exposure frame of conventional one color super-resolution techniques, which results in a reduction of acquisition time for multi-color super-resolution imaging. Furthermore, no filtering of the sensed data to separate the wavelengths as in standard fluorescence imaging is necessary here, thus a higher photon throughput is obtained compared to standard multi-color super-resolution techniques.

According to a variant of the disclosure, the step of sensing can be configured to sense the intensity of the electromagnetic radiation emitted by the target over multiple consecutive sensing frames, in particular from 4 up to 300 000 consecutive sensing frames. The frequency information can be obtained in the timeframe of a single exposure frame of conventional one color super-resolution techniques, resulting in a reduction of acquisition time.

According to a variant of the disclosure, the method can comprise a step of analyzing the intensity of the electromagnetic radiation emitted by the target independently of the wavelength of the electromagnetic radiation.

According to a variant of the disclosure, the step of processing can comprise a step of demodulating the data obtained during the step of sensing, to identify individual contributions of the different wavelengths to the intensity of the sensed electromagnetic radiation for each modulation frequency. According to a variant of the disclosure, based on the demodulated data, the wavelength of the emitted electromagnetic radiation can be identified based on the different modulation frequencies.

According to a variant of the disclosure, the step of processing can further comprise a step of localizing individual fluorescence elements in the target. The step of localization is performed in multiple color channels and enables to assign a color to each localization of a fluorescence element.

According to a variant, the step of processing can comprise reconstructing an image of the fluorescence emitting elements in the target based on the step of localizing. A super-resolution image with high resolution, or high image resolution, can be reconstructed with the current disclosure. A high image resolution corresponds to 10-30 nm.

According to a variant of the disclosure, the method for multi-color imaging using frequency-modulated illumination can be applied to single-molecule microscopy, in particular to single-molecule localization microscopy techniques, more in particular super-resolution microscopy, and even more in particular to STORM, PALM, PAINT and DNA-PAINT. The method of the current application applied to single-molecule localization microscopy techniques can enable to obtain a gain in throughput and imaging speed. The known state of the art DNA-PAINT single-molecule localization microscopy technique combined with the frequency-modulated illumination, which can also be called frequency-modulated-DNA-Paint or fm-DNA-PAINT, can enable to obtain an increase of gain in imaging throughput and improved imaging speed, as fm-DNA-PAINT enables to image simultaneous multiple colors in the same acquisition time as for one color in standard DNA-PAINT Single-Molecule Localization Microscopy technique. The known state of the art STORM Single-Molecule Localization Microscopy technique combined with the frequency-modulated illumination, which can also be called frequency-modulated-STORM or fm-STORM, can enable to obtain comparable imaging speed or even faster than sequential multicolor imaging while the cross-talk correction can be performed with improved accuracy of properly assigned localizations above 95% compared to 88% for one of the previous STORM implementations.

The invention also relates to an imaging device for multi-color imaging using frequency-modulated illumination comprising a target illumination system for illuminating a target with electromagnetic radiation comprising a plurality of wavelengths and a sensing system configured to sense electromagnetic radiation, characterized in that the illumination system comprises a modulation means to modulate each wavelength of the electromagnetic radiation with a different modulation frequency. In contrast to standard fluorescence sensing, in which color discrimination is achieved based on spectral filtering of the emitted fluorescence, color discrimination can be based here on the absorption properties of the fluorescence elements and thus enables to eliminate the need of spectral filters placed before the sensing system. A simpler experimental imaging device with higher throughput can be achieved compared to the state of the art fluorescence microscopy imaging devices.

According to a variant of the disclosure, the modulation means of the illumination system can comprise a plurality of acousto-optic modulators (AOM), and/or a wheel with Neutral Density filters and/or an Acousto-Optic Tunable Filter (AOTF) and/or a Spatial Light Modulator (SLM). The plurality of acousto-optic modulators enables to modulate the intensities of the plurality of different wavelengths of electromagnetic radiation with frequency, to obtain a plurality of modulated wavelength of electromagnetic radiation with different modulating frequencies each.

According to a variant of the disclosure, the illumination system can further comprise an activation means, comprising an un-modulated electromagnetic radiation source. Thus, the method can also be applied to fluorescence elements of the target needing to be activated to be in the bright state, like for example fluorescent organic dyes. A wide range of fluorescence elements can be used, such as fluorescent proteins, small fluorescent dyes, and quantum dots. This can be relevant for frequency modulated or fm-STORM applications of the technology. The unmodulated electromagnetic radiation source, e.g. an unmodulated laser switches the fluorophore into the fluorescent state such that the modulated radiation sources can then be used to excite that fluorophore and collect the fluorescent signal in a color-blind fashion.

According to a variant of the disclosure, the illumination system can further comprise an electromagnetic radiation combining means to combine the plurality of different wavelengths of electromagnetic radiation to illuminate the target simultaneously. Combining the plurality of modulated wavelengths of electromagnetic radiation enables to obtain a frequency multiplexing illumination. The frequency multiplexing illumination enables to shift the spectroscopic wavelength axis into a frequency domain measurement, eliminating the need to filter the corresponding fluorescence emissions of the plurality of different fluorescence targets, in contrast to standard fluorescence techniques working in the time domain. Furthermore, an activation electromagnetic radiation can also illuminate the target with the plurality of different modulated electromagnetic radiations enabling the method to be applied to diverse single molecule localizations techniques using a wide range of fluorescence elements, taking into account the photoswitching mechanism of the fluorescence elements.

According to a variant of the disclosure, the sensing system can comprise a sensing device being a color blind electromagnetic sensing means and/or devoid of any color filtering means. Thus, a single sensing device can sense multiple colors resulting in an imaging device being simpler compared to standard fluorescence microscopy imaging devices, where multiple detectors are required as one detector detects one color. Furthermore, no color filtering means are required for sensing resulting in a higher throughput in sensing and in a simpler optical configuration as fewer optical components are required compared to standard detection system.

According to a variant of the disclosure, the imaging device can further comprise a processing means to analyze the intensity of the sensed electromagnetic radiation independent of the wavelength of the electromagnetic radiation.

According to a variant of the disclosure, the processing means can be configured to demodulate the sensed electromagnetic radiation to identify contributions attributed to the different wavelengths of electromagnetic radiation based on the modulation frequencies.

According to a variant of the disclosure, the processing means can be configured to localize individual fluorescence elements in the target. Thus, each individual fluorescence element in the target can be assigned to a color.

According to a variant of the disclosure, the processing means can be configured to reconstruct an image of the fluorescence emitting elements in the target based on the determined individual fluorescence elements localizations. A super-resolution image with high resolution, or high image resolution, can be reconstructed with the current disclosure. A high image resolution corresponds to 10-30 nm.

BRIEF DESCRIPTION OF THE FIGURES

The patent or application file contains at least one drawing executed in color. Copies of this patent or patent application publication with color drawing(s) will be provided by the Office upon request and payment of the necessary fee.

The disclosure may be understood by reference to the following description taken in conjunction with the accompanying figures, in which reference numerals identify features of the disclosure.

DETAILED DESCRIPTION

Figure 1A:
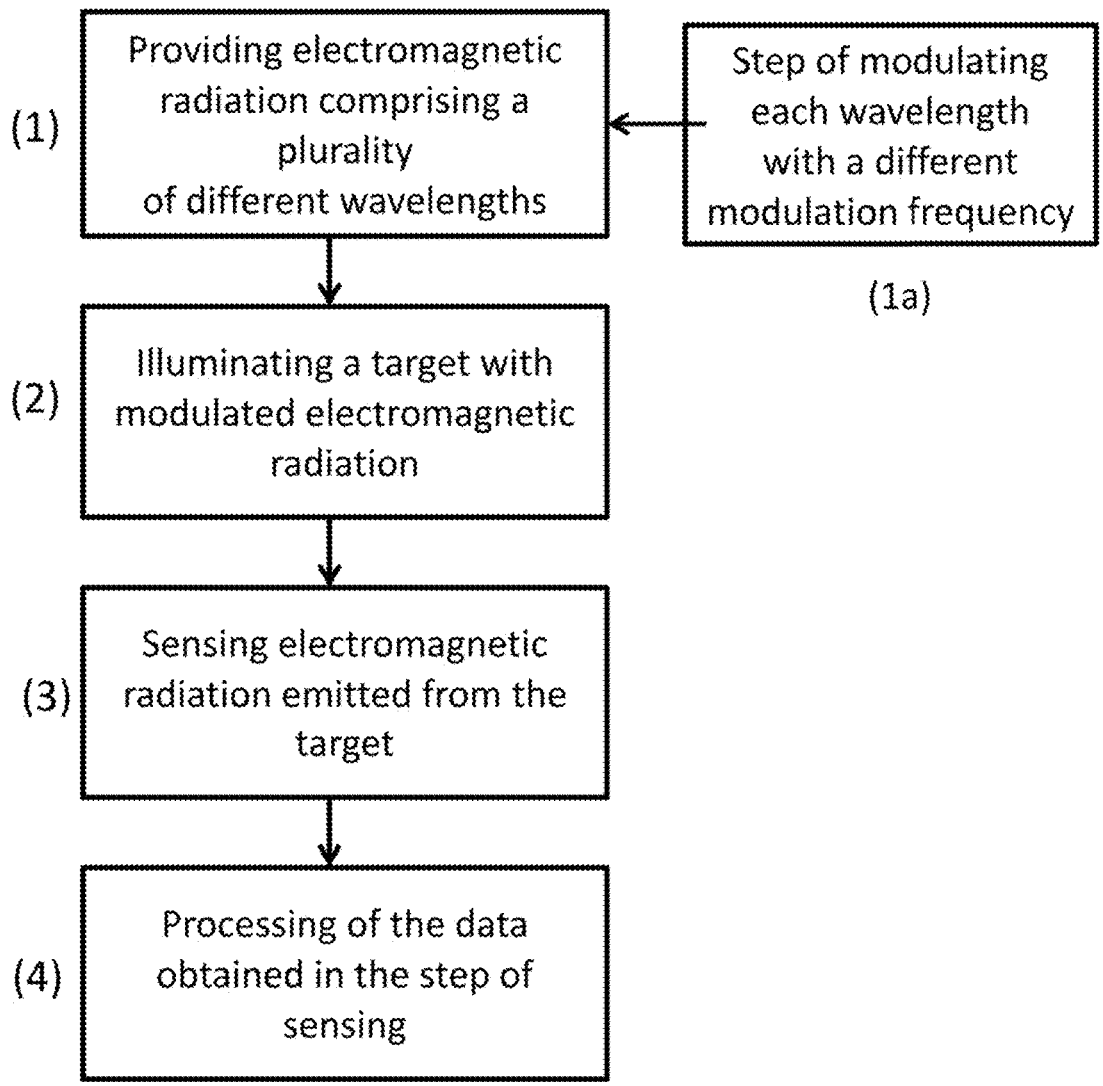
FIG. 1a, FIG. 1b, and FIG. 1c illustrate a schematic diagram of the steps of a method for simultaneous multi-color imaging according to a first embodiment of the disclosure and its variants.
Figure 1B:
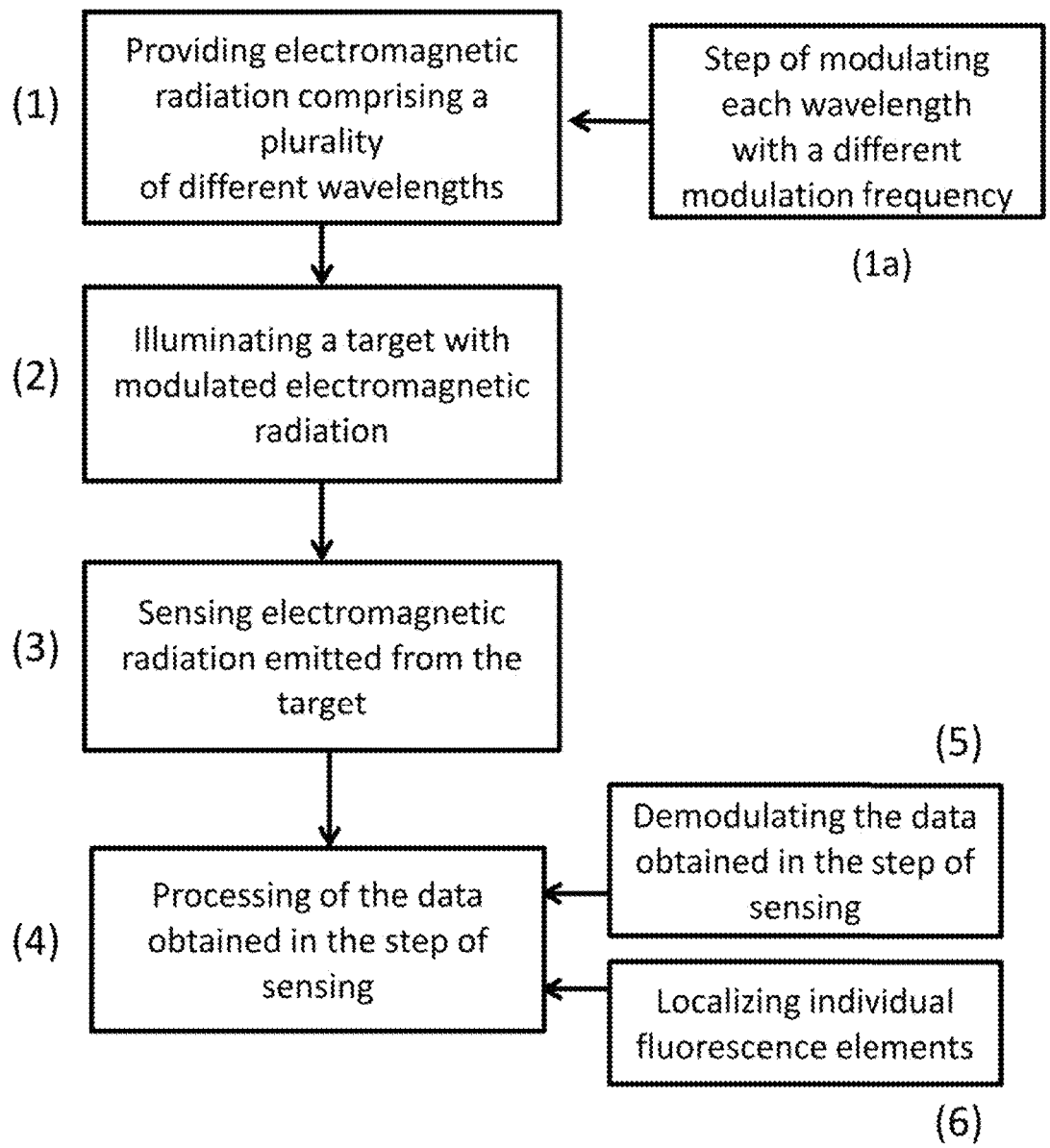
Figure 1C:
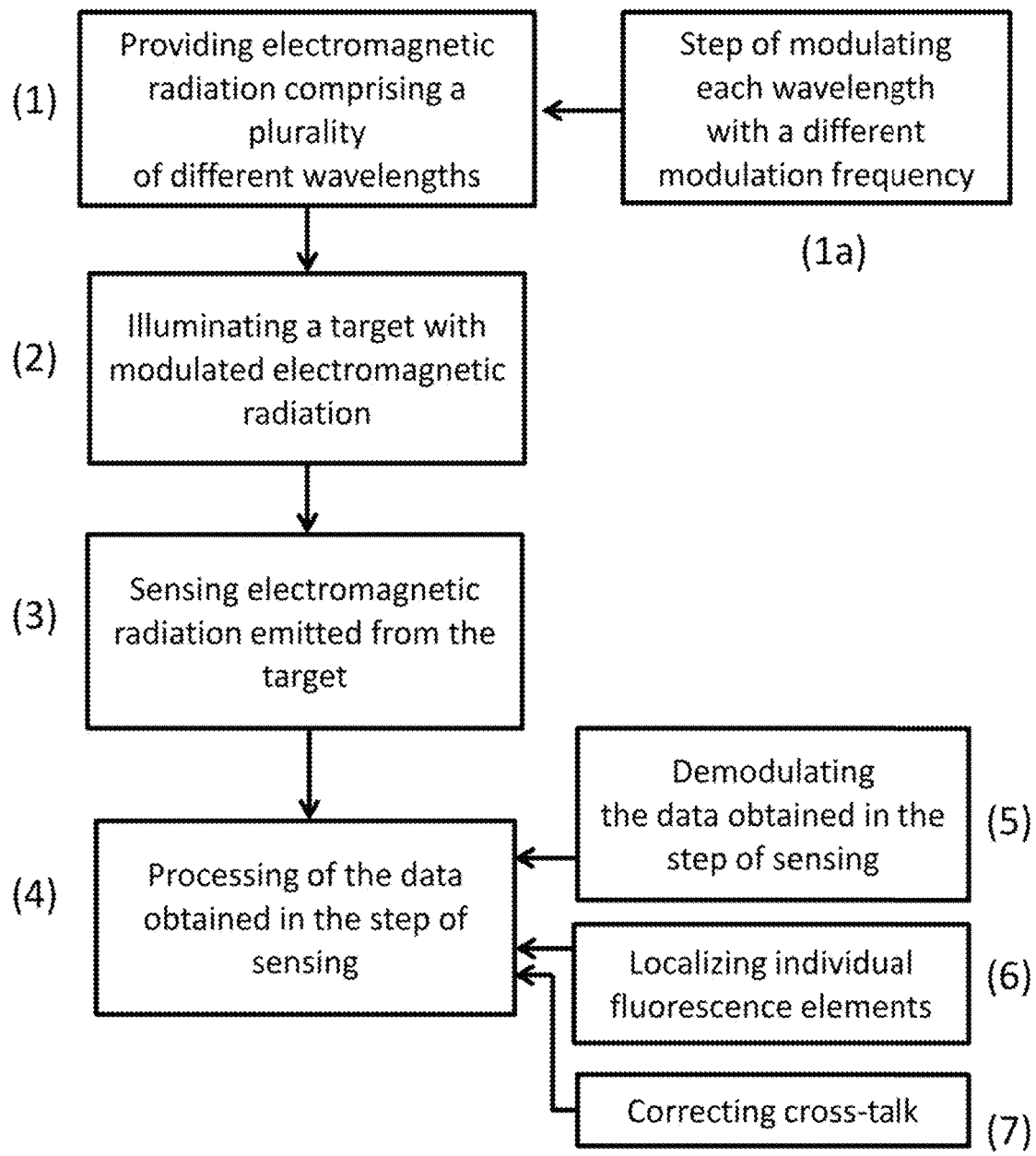

FIGS. 1a to 1c illustrate a schematic diagram of the steps of a method for simultaneous multi-color imaging according to a first embodiment of the disclosure and its variants.

The first embodiment of the disclosure is shown in FIG. 1a, for a method for simultaneous multi-color imaging using frequency-modulated illumination comprising a step 1 of providing electromagnetic radiation with a plurality of different wavelengths, comprising a step of modulating each wavelength with a different modulation frequency, a step 2 of illuminating a target with the modulated electromagnetic radiation, a step 3 of sensing electromagnetic radiation emitted from the target, and a step 4 of processing the data obtained in the step of sensing.

The step 1 of providing electromagnetic radiation with a plurality of different wavelengths comprises a step 1a of modulating each wavelength with a different frequency. The step 1a of modulating is performed to modulate independently the intensities of a plurality of different wavelengths of electromagnetic radiation with frequency. The step 1a of modulating is performed so that the plurality of different wavelengths of electromagnetic radiation can be modulated at different frequencies. The frequency modulation shifts the spectroscopic wavelength axis into a frequency-domain measurement.

Electromagnetic radiation with a plurality of different wavelengths can be emitted from a plurality of electromagnetic radiation sources. Each electromagnetic radiation source has a different wavelength of electromagnetic radiation. In particular, the electromagnetic radiation source is a light source. The light source can be a continuous wave (CW) laser, a pulse laser or any other light source.

In a variant, a single electromagnetic radiation source can be used to emit electromagnetic radiation with a plurality of different wavelengths. For example, the electromagnetic radiation source can be one laser source with a broadband distribution of wavelengths. In this case, the step 1 of modulation results in modulating each wavelength of the electromagnetic radiation emitted by the single source at a certain modulation frequency, so that a plurality of modulated wavelengths of electromagnetic radiation at different modulation frequencies can be obtained from one single electromagnetic source.

Typical operational modulation frequencies are preferably comprised between 1 Hz and 1 kHz, in particular between 1 Hz and 50 Hz, but according to a variant even higher modulation frequencies can be used, in particular up to 200 Hz.

The step 1 of modulating electromagnetic radiation is done by a plurality of acousto-optic modulators (AOM), each wavelength of electromagnetic radiation having its individual acousto-optic modulator (AOM). Thus, each wavelength of electromagnetic radiation is independently modulated.

In a variant, the plurality of wavelengths of electromagnetic radiation can also be modulated dependently, by using for example only one modulator device for the plurality of different wavelengths of electromagnetic radiation, which can then modulate simultaneously the plurality of different wavelengths of electromagnetic radiation. An example of only one modulator device can be a wheel with Neutral Density filters or a common Acousto-Optic Tunable Filter (AOTF) that can modulate different wavelengths at different frequencies or a Spatial Light Modulator (SLM). The step 1 of modulating electromagnetic radiation can also be done with any other device enabling the modulation of the plurality of different wavelengths of electromagnetic radiation, dependently or independently. The modulation of electromagnetic radiation can be a sine-wave modulation, but it can also be a square wave modulation or any other type of modulation. A sine-wave modulation is cleaner since there will be only a single frequency compared to a square waves modulation which has multiple frequency components, which would lead to signals on the harmonics making detection less efficient and potential cross talk with other modulation frequencies.

In a variant, the plurality of wavelengths of electromagnetic radiation can also be modulated directly at the electromagnetic radiation source. For example, at the laser head when the electromagnetic radiation source is a laser head. No additional element is required to modulate the plurality of wavelengths of electromagnetic radiation, as the electromagnetic radiation sources are modulated electromagnetic radiation sources.

The modulation of the electromagnetic radiation with a plurality of different wavelengths results in a plurality of different modulated wavelengths of electromagnetic radiation at different frequencies defined by F/m, where F is the sensing device frame rate in Hz used for the step 3 of sensing and m is the frame window size of the modulation. The frame window size is chosen depending on the desired number of channels and imaging conditions. For a given frame window, m, m/2 frequency bins $f_n$ and therefore m/2 available color-channels will be generated during the step 4 of processing. For example, an estimate of three frequency bins $f_n$, and hence three colors, can be fit inside a modulation frame window of m=6 frames, which will maintain a good separation between the frequency bins $f_n$. The number of channels can further be increased, while maintaining the effective frame rate, just by increasing the sensing device frame rate of acquisition and the frame window size.

In a variant of the embodiment, the step 1 of modulating is not performed for all the wavelengths of electromagnetic radiation. One or more wavelength(s) of electromagnetic radiation can be un-modulated. The un-modulated electromagnetic radiation wavelength can be used as an activation electromagnetic radiation, in particular as activation light.

The step 1a of modulating electromagnetic radiation provides a frequency multiplexing electromagnetic radiation, using the plurality of different modulated wavelengths of electromagnetic radiation at distinct modulation frequencies.

A step 2 of illuminating a target with the modulated electromagnetic radiation is subsequently performed. The step 2 of illuminating relies on the frequency multiplexing electromagnetic radiation resulting from the previous step 1a of modulating, to illuminate simultaneously a target with the different modulated wavelengths of electromagnetic radiation with different modulation frequencies each. In particular, the modulated electromagnetic radiation is an excitation radiation. Thus, the step 2 of illuminating is performed in the frequency domain, in contrast to state of the art fluorescence techniques where the illumination is performed in the time domain.

The target comprises a plurality of different fluorescence elements. The fluorescence elements can be photoswitchable fluorophores which can be cycled between bright and dark states or fluorophores exhibiting transient binding. In transient binding, the on/off is achieved in a different way that no longer depends on fluorescent states but on the transient binding and unbinding of fluorophores to a target. The fluorescence elements can be fluorescent proteins, small fluorescent dyes, and quantum dots or any other fluorescence entities.

The step 2 of illuminating relies on the absorption properties of the target, and in particular of the plurality of fluorescence elements in the target, since individual fluorescence elements will emit fluorescence directly proportional to their absorption cross-section at a given excitation wavelength. Thus, by modulating the plurality of different wavelengths of electromagnetic radiation at distinct frequencies, fluorescence elements with different excitation spectra will be excited to a varying degree according to their absorption cross-section at each given electromagnetic radiation wavelength. This is in contrast to standard fluorescence techniques, which rely on spectral filtering of the emitted electromagnetic radiation of the fluorescence elements.

By modulating the intensity of the different wavelengths of electromagnetic radiation at different frequencies, the color channels can be determined based on the fluorescence elements response to the modulated wavelengths of electromagnetic radiation with different modulation frequencies.

The step 2 of illuminating provides a wide-field illumination of the target, in particular of the plurality of different fluorescence elements, such that a large region of the target can be illuminated, in particular at least 80 μm×80 μm, more in particular 100 μm×100 μm. This is also called an epi-illumination, where the target is illuminated and the electromagnetic radiation emitted from the target is collected through the same objective used for the illumination, or total internal reflection fluorescence (TIRF) illumination. The illumination area depends on the microscope objective used to illuminate the target. Epi-illumination and TIRF-illumination use a lens to focus the light onto the back focal plane of the objective such that the light is collimated by the objective. The illumination is not focused on the target to a small point, like a diffraction limited spot, normally of the order of 200 to 300 nm, thus the current disclosure enables to illuminate a large portion of interest of the target.

In a variant of the embodiment, the illumination can also be a highly inclined (HiLo) illumination. The highly inclined illumination (HiLo) is achieved by using a lens before the objective, the angle of the laser beam can be tilted to achieve higher signal to noise because only the portion of the target of interest which needs to be visualized is illuminated. The difference between epi-, Hilo and TIRF is the angle by which the light reaches the sample. To change the angle, the lens is translated with respect to the center position of the objective such that the light enters through the side of the objective rather than the center.

In this embodiment, a step 3 of sensing electromagnetic radiation emitted from the target is performed after the step 2 of illuminating the target with the modulated electromagnetic radiation. The sensed electromagnetic radiation during the step 3 of sensing corresponds to the electromagnetic radiation emitted from the target, in particular from the plurality of different fluorescence elements. The step 3 of sensing enables to sense simultaneously the emitted electromagnetic radiation from the plurality of different fluorescence elements in the target. In particular, the emitted electromagnetic radiation corresponds to the fluorescence emission of the plurality of fluorescence elements in the target.

The step 3 of sensing is performed by a sensing system. The sensing system can comprise a single sensing device. The single sensing device can be a charge-coupled device (EM-CCD) Camera or a scientific complementary metal-oxide-semiconductor (sCMOS) Camera. In a variant, it can also be any other type of sensing device sensitive enough to sense the photon signal from a single emitting element.

The single sensing device performs the step 3 of sensing in a color-blind fashion, so that multiple colors can be sensed simultaneously. Thus, the step of sensing does not require as much time as in standard multi-color detection techniques where one color is sensed at a time, as the standard multi-color techniques work sequentially. The acquisition time of the step 3 of sensing reduces considerably in comparison to standard multi-color techniques.

The color-blind electromagnetic sensing means senses the output photons coming from the target and associates a value to each pixel in ADU (analog to digital units), in proportion to the number of photons sensed, but not measuring or distinguishing between different wavelengths ("colors"). This value ranks from 0 to $2^{16}$ for a 16 bits camera. Thus, the step 3 of sensing senses simultaneously all photons from a wide range of wavelengths equally and indistinctly. The step 3 of sensing comprises sensing the intensity of the electromagnetic radiation emitted by the target, in particular the fluorescence emission, independently of the wavelength of electromagnetic radiation used for illumination, thus independently of the modulated wavelength of electromagnetic radiation.

The step 3 of sensing is configured to sense the intensity of the electromagnetic radiation emitted by the target over multiple consecutive sensing frames m, determined by the modulation frame window size m. The frame window size m is chosen depending on the desired number of channels and imaging conditions. The step 3 of sensing performs then multiple measurements of these m consecutive sensing frames, in particular 60 000 measurements. The acquisition time of the step 3 of sensing depends on the sensing device frame rate and the time needed to collect a sufficient number of localizations to satisfy the Nyquist criterion for high image resolution. The Nyquist criterion refers to the number of single molecule localizations that need to be detected in order to re-construct a super-resolution image that faithfully represents the target to be imaged. This is because a super-resolution image is generated by localizing the position of thousands of individual fluorescence elements on the target. If there are only a few fluorescence elements present, then the image would consist only of a few points, i.e. it is under-sampled. In the method of the current disclosure, the frequency information can be obtained in the timeframe of a single exposure frame of conventional multi-color super-resolution techniques.

The step 3 of sensing and the step 1a of modulating are actually synchronized to have a simultaneous modulation and sensing of electromagnetic radiation.

In a variant of the embodiment, in the step 3 of sensing, multidimensional single-molecule data in which spatial coordinates, intensity, polarization and spectral discrimination can also be obtained using a second sensing device.

A step 4 of processing the data obtained during the step 3 of sensing, in particular the electromagnetic radiation sensed in the step 3, is performed after the step 3 of sensing. An image of the fluorescence elements based on the sensed data is obtained for each sensing frame independently of the modulated wavelength of electromagnetic radiation. The intensity evolution of the fluorescence element within a given frame window m is then analysed, independently of the modulated wavelength of electromagnetic radiation.

In a variant of the disclosure, as shown in FIG. 1b, the step 4 of processing comprises a step 5 of demodulating the data sensed during the step 3 of sensing.

The step 5 of demodulating can comprise performing a Fourier Transform (FT) analysis, in particular a Fast Fourier Transform (FFT). The Fourier Transform converts the intensity evolution of the fluorescence target in the time domain for a given frame window into the frequency domain. The step 5 of demodulating uses Fourier analysis to retrieve the magnitude of the individual fluorescence targets signals at the different frequencies. The intensity evolution of the fluorescence elements within a given frame window (m), is transformed to the frequency domain using a one dimensional Discrete Fourier Transform (DFT). The frame window size is chosen for the demodulation depending on the desired number of channels and imaging conditions. For a given frame window, m, the DFT generates m/2 frequency bins $f_n$ and therefore m/2 available color-channels. For example, an estimate of three frequency bins, and hence three colors, can be fit inside a demodulation frame window of m=6 frames, which will maintain a good separation between the frequency bins. The number of channels can further be increased, while maintaining the effective frame rate, just by increasing the sensing device frame rate of acquisition and the frame window size. The magnitude of the individual fluorescence elements in the frequency domain were used to assign a pixel value to its channel on the demodulated data, corresponding to each frequency bin $f_n$ in use.

The step 5 of demodulating the sensed data, in particular the electromagnetic radiation emitted by the target, allows filtering the sensed electromagnetic radiation based on the different modulation frequencies of the modulated wavelength of electromagnetic radiation. Indeed, the step 5 of demodulating comprises an inherent filtering as the frequency of interest can be isolated from other frequencies that might be present in the frequency domain. Thanks to this demodulating step 5, the step 3 of sensing does not require further spectral filtering of the sensed electromagnetic radiation for the sensing system, in particular the fluorescence emission, as is required for standard fluorescence techniques, like for example the use of optical filters to select the wavelength of the fluorescence emission. Thus, an absolute maximal photon throughput can be provided for the sensing step.

As shown in FIG. 1b, the step 5 of demodulating the sensed data obtained during the step 3 of sensing is performed before a step 6 of localizing of single fluorescence targets in the sensed electromagnetic radiation.

In a variant, the step 5 of demodulating can also be performed after the step 6 of localizing the fluorescence elements in the target. Performing the step 5 of demodulating before or after the step 6 of localizing produces similar results.

A step 6 of localizing of the fluorescence targets in each channel of the demodulated frames is done by performing a simple Gaussian fitting (2D) or elliptical Gaussian fitting (3D) or any other type of fitting adequate for localizing fluorescence targets in demodulated frames. Insight3, a software program readily available and known in the art can be used to localize the fluorescent molecules in each channel of the demodulated frames. The code fits a 2D Gaussian to each Point Spread Function (PSF) and calculates their center positions (x, y) for 2D imaging and (x, y, z) for 3D imaging. But any software program configured to use demodulated signals for the localization of fluorescence elements can be used. In a variant of the embodiment, the localizations can be subsequently classified as single-frame or multi-frame localizations, depending on whether they appeared only in one frame or in multiple subsequent frames. A color is assigned to each localization of a fluorescence element.

According to a variant of the disclosure, as shown in FIG. 1c, a further step 7 of correction of color cross-talk can be performed after the step 6 of localization. This step of correction of color-cross talk will be performed depending on the type of frequency modulated single molecule localization implementation. The purpose of color correction is to reassign localizations that were initially classified into the wrong color channel. In this step 7 of correction of color cross-talk, localizations appearing in all the color channels are identified and assigned to either one of the individual channels. For example, this can be done by comparing the intensity of the signal of one channel with respect to the signals on the other channels and assigning the color of the fluorescence element to the channel with the highest intensity value. This can be done by comparing the sum of pixel intensity values within a determined area around the center of the localization on the demodulated data. For example, an area of 3×3 pixels or 4×4 pixels can be used. Another example for performing this step 7 of correction of color cross-talk can be to implement a machine learning algorithm using open source software package like Python. But any software program enabling to reduce cross-talk based on the demodulated data could be used.

A variant of the first embodiment of the disclosure relates to the use of frequency-modulated illumination applied to single molecule microscopy, in particular single-molecule localization microscopy techniques, more in particular super-resolution microscopy. The method of the current application applied to super-resolution microscopy techniques can enable to obtain a gain in throughput and imaging speed compared to standard imaging techniques.

A particular example of a variant of the first embodiment of the disclosure relates to the use of frequency-modulated illumination, and in particular frequency-modulated excitation, applied to DNA-PAINT single-molecule localization microscopy. This particular method can also be called fm-DNA-PAINT for frequency-modulated DNA-PAINT.

DNA-PAINT is a single molecule localization microscopy method that uses oligo probes functionalized with spectrally distinct fluorophores. In this case, the on/off switching is achieved via the transient binding of oligos to a secondary antibody functionalized with the complementary strand. This approach is particularly interesting for multi-color imaging since the on/off photoswitching is decoupled from fluorophore photophysics and conventional fluorophores can be used.

Another particular example of a variant of the first embodiment of the disclosure relates to the use of frequency-modulated illumination, and in particular frequency-modulated excitation, applied to STORM single-molecule localization microscopy. This particular method can also be called fm-STORM for frequency-modulated STORM.

STORM is another commonly used single molecule localization microscopy method, which relies on the use of buffers containing reducing agents and oxygen scavengers in order to induce photoswitching behavior in organic fluorophores.

Figure 2A:
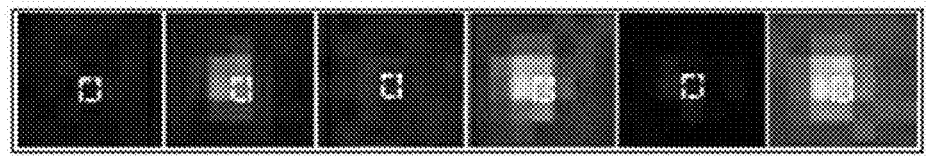
FIG. 2a, FIG. 2b, and FIG. 2c illustrate a representative example of data processing according to a practical example of a variant of the first embodiment of the disclosure, namely fm-DNA-PAINT.
Figure 2B:
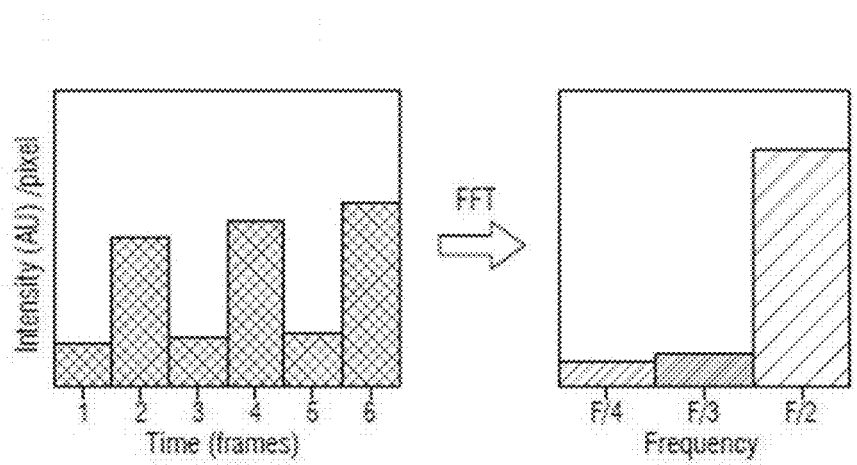
Figure 2C:
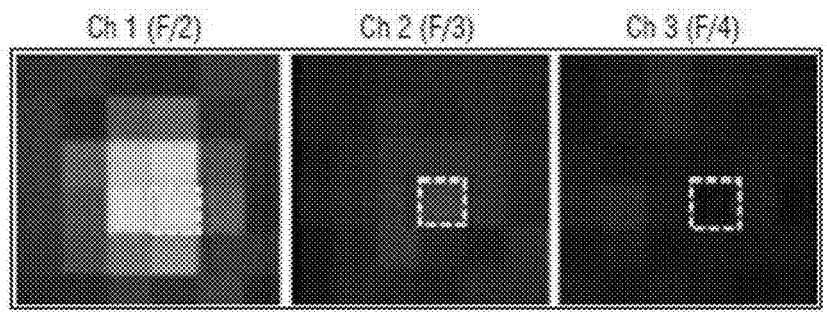

FIGS. 2a to 2c illustrate a representative example of data processing according to a variant of the first embodiment of the disclosure. In this variant, the method for multi-color super-resolution imaging according to the disclosure uses frequency-modulated excitation applied to DNA-PAINT single-molecule localization microscopy, namely fm-DNA-PAINT.

FIG. 2a shows panels of a sub-region of interest of six consecutive frames of raw data where a fluorescence element, here called a fluorophore, is present. FIG. 2b shows the intensity evolution of the selected pixel, referenced as the white box in FIG. 2a, in time domain (left) and in the frequency domain (right) after performing a Fast Fourier Transform over the six frames. FIG. 2c shows the resulting demodulated data split into the three different color channels.

Imaging for fm-DNA-PAINT modality was performed using highly inclined (HiLo) illumination with an excitation intensity of ~300W/cm$^2$ for the 488 nm, 561 nm and 647 nm laser lines. The highly inclined illumination (HiLo) is achieved by using a lens before the objective, the angle of the laser beam can be tilted to achieve higher signal to noise because only the portion of the target of interest which needs to be visualized is illuminated. The plurality of fluorescent elements are illuminated by three modulated laser sources at three different frequencies F/2, F/3 and F/4, where F is the camera frame rate in Hz. Camera frame rate of 60 Hz was used. The fluorophores emitted light proportionally to their absorption cross-sections at each excitation wavelength, see FIG. 2a.

In this practical example of fm-DNA-PAINT, three modulated electromagnetic radiation sources were used but more modulated electromagnetic radiation sources can be used. The current disclosure is not limited to three colors and can use any number of colors, and one electromagnetic radiation source per color is needed. The electromagnetic radiation sources used were lasers, three different lasers, each having a different wavelength of laser line.

For this practical example of fm-DNA-PAINT, a biological target or sample labelled with fluorophores was used. In particular, the fluorophores are conjugated to a DNA-strand that can reversibly bind to a docking DNA strand on the target.

For frequency multiplexed fm-DNA-PAINT, the intensity evolution of the fluorophore in the time domain, corresponding to six consecutive frames acquired at an exposure time of 16ms per frame (F=60 Hz), was converted into intensities in the frequency domain by performing a Fast Fourier Transform (FFT) (FIG. 2b). The localization of the fluorophore is performed after this demodulation step in the multiple color channels and a color is assigned to each localization accordingly.

For a frame rate of 60 Hz used here, it is thus possible to image three colors with an effective frame rate of 10 Hz. This frame rate is equivalent to the one typically needed for acquiring one color conventional DNA-PAINT images, decreasing the acquisition time and improving the imaging throughput. Since these acquisition settings do not reach the limit of photon collection, the number of channels can further be increased, while maintaining the effective frame rate, just by increasing the camera frame rate of acquisition and the frame window size.

In this practical example, the demodulation of the detected signal was performed before finding and localizing single molecule peaks in the detected signal.

Demodulation of the detected signal was carried out using a custom written Python Code, but any software program configured to carry demodulation can be used. For the demodulation, packages of six frames with frame window size m, were used, as can be seen in the panels of FIG. 2a.

To carry out the demodulation, as shown in FIG. 2b, the intensity evolution of each pixel from these six frames were transformed from the time domain, i.e. within a given frame window m, to the frequency domain (right panel of FIG. 2b) using a one dimensional Discrete Fourier Transform (DFT) for real input:

$$X_k = \sum_{n=0}^{m-1} x_n \cdot e^{-i2\pi k \cdot \frac{n}{m}}; k = 0, \ldots, m-1$$

where, $X_0, \ldots, X_{m-1}$ are the Fourier Transformed output values in the discrete frequency domain, $x_0, \ldots, x_{m-1}$ are the real discrete input values from time domain, i is the imaginary unit and m is the total number of real input values (equal to the frame window size).

The Discrete Fourier Transform presents symmetry, $X_0$ and $X_{m/2}$ being real values. The rest of the output values from the DFT are specified by just (m/2)-1 complex numbers, because the remaining output values are the conjugated. For a given frame window, m, the DFT generates m/2 frequency bins and therefore m/2 available color-channels. Therefore, a six frame window size (m=6), will provide three frequency bins and thus three available color channels, as can be seen in FIGS. 2a and 2b. The $X_0$ corresponds to DC component. The DC component contains no valuable information, while the AC components encode the amplitudes at which the molecule absorbs each excitation laser, and hence reveal the spectral characteristics of that localization. For this calculation, the efficient Fast Fourier Transform algorithm (FFT) was used. The absolute values of the intensities in the frequency domain were used to assign a pixel value to its channel on the demodulated data, corresponding to each frequency bin in use. A frame window of 6 frames and a camera frame rate of F=60 Hz result in frequency bins of 30 Hz, 20 Hz and 10 Hz.

The localization of the fluorophore was performed after this demodulation step in the multiple color channels and a color was assigned to each localization accordingly. Insight3, a software program, was used to localize the fluorescent molecules in each channel of the demodulated frames by performing a simple Gaussian fitting (2D) or elliptical Gaussian fitting (3D). But any software program configured to use demodulated signal for the localization of fluorescent molecules can be used.

In this variant, no crosstalk correction step was performed, as the percentage of correct fluorophore assignment was higher than 90%, in particular higher than 96%. However, according to a variant, a color cross-talk correction step could be performed after the localization step, in order to reduce further the color cross-talk.

DNA-PAINT is particularly amenable to frequency multiplexing, since the fluorophore functionalized oligo stays bound to its complimentary oligo for long time periods, about few hundred milliseconds. Hence, the bound fluorophore can be detected over multiple frames when imaged at the rate of 16ms per frame. As a result, the color assignment becomes unambiguous.

fm-DNA-PAINT offers a major advantage over conventional DNA-PAINT since it can acquire three or more colors in the same amount of time needed to acquire one color DNA-PAINT data and produces reduced color cross-talk. In this current implementation, the number of colors was only limited by the commercially available oligo-coupled antibodies and as such, there is no fundamental limit to extend this approach to more colors or only two colors.

Figure 3A:
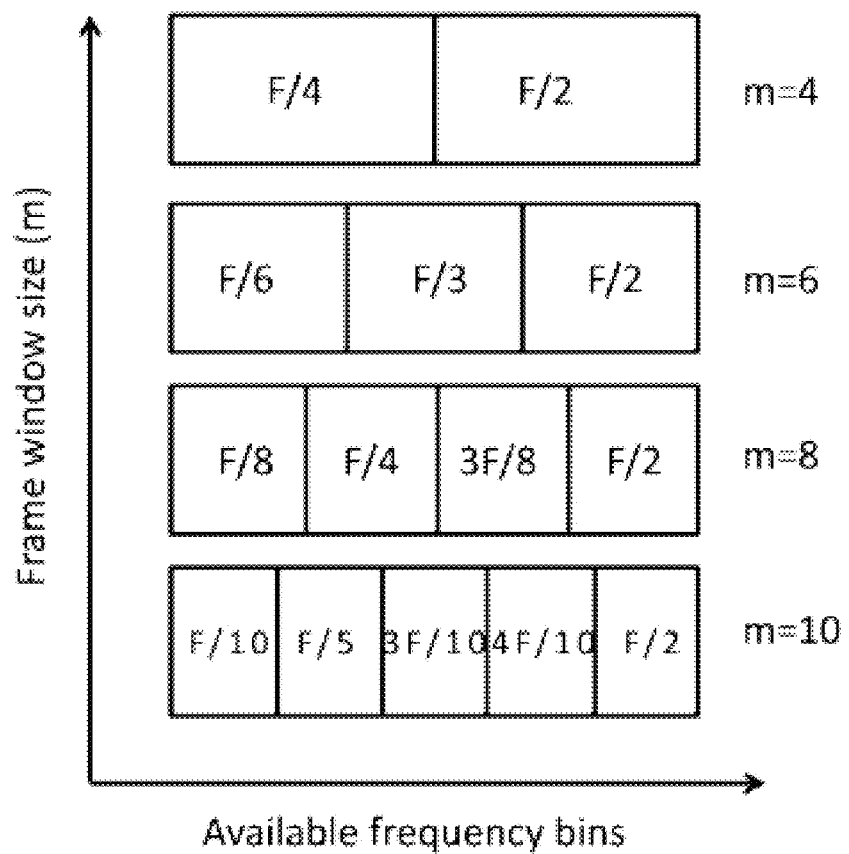
FIG. 3a and FIG. 3b show the available frequency bins ($f_n$) for a given demodulation frame window size (m) and the acquisition speed versus number of colors respectively in fm-DNA-PAINT, according to a variant of the first embodiment of the disclosure.
Figure 3B:
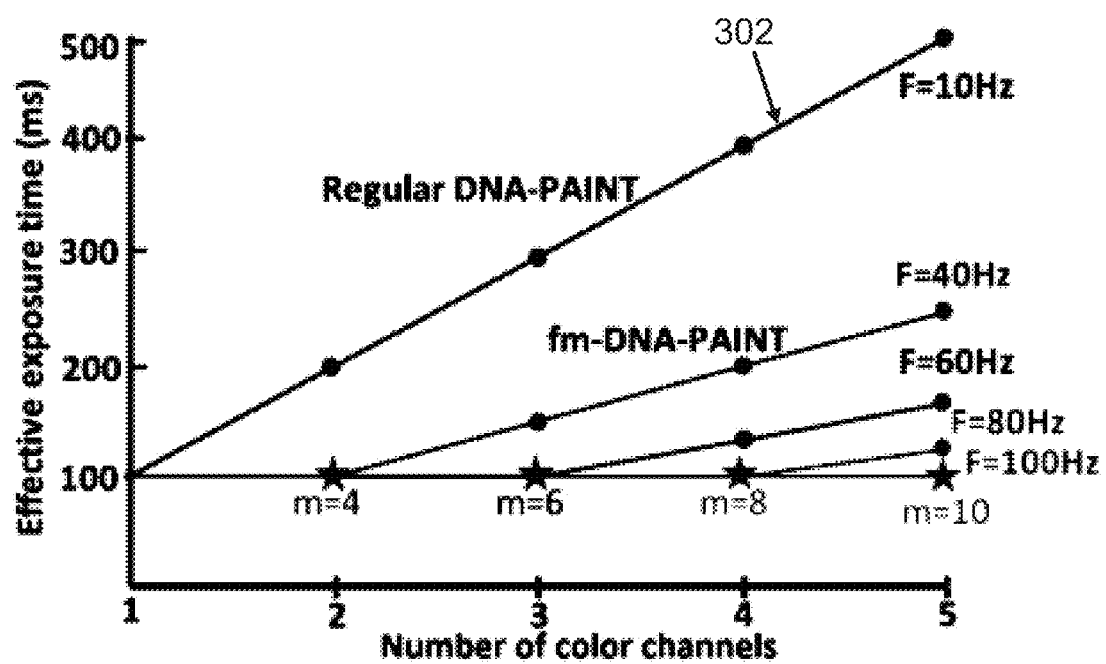

FIGS. 3a and 3b show the acquisition speed versus number of colors in fm-DNA-PAINT, according to a variant of the first embodiment of the disclosure.

The scheme in FIG. 3a shows the available frequency bins $f_n$ and hence the number of colors for a given demodulation frame window size m. The effective frame rate, and hence the imaging speed, scales as F/m, where F is the camera frame rate used for acquisition. FIG. 3b shows the effective exposure time versus the number of color channels for camera frame rate F of 60 Hz, 80 Hz and 100 Hz. Line 302 shows conventional DNA-PAINT, assuming an exposure time of 100 ms per color in the sequential approach.

fm-DNA-PAINT is particularly powerful as it is faster than conventional multi-color DNA-PAINT. There are some practical limits that determine the acquisition speed and the number of color channels, such as the separation between the center of the frequency bins $f_n$ used for modulation, the overlap between the excitation spectra of fluorophores, camera frame rate and the signal to noise ratio. The number of frequency bins $f_n$ and hence the number of available color channels depends on the number of frames used for demodulation m, see FIG. 3a. For example, an estimate of three frequency bins and hence three colors can be fit inside a demodulation frame window of m=6 frames, see FIG. 3a, which will maintain a good separation between the frequency bins $f_n$.

The effective frame rate depends on the camera frame rate F and the demodulation frame window m, see FIG. 3a. For a frame rate of 60 Hz, it is thus possible to image three colors with an effective frame rate of 10 Hz. This frame rate is equivalent to the one typically needed for acquiring one color conventional DNA-PAINT images, decreasing the acquisition time and improving the imaging throughput by three-fold, see FIG. 3b. Since these acquisition settings do not reach the limit of photon collection, the number of channels can further be increased, while maintaining the effective frame rate, just by increasing the camera frame rate of acquisition and the frame window size, see FIG. 3a.

Figure 4A:
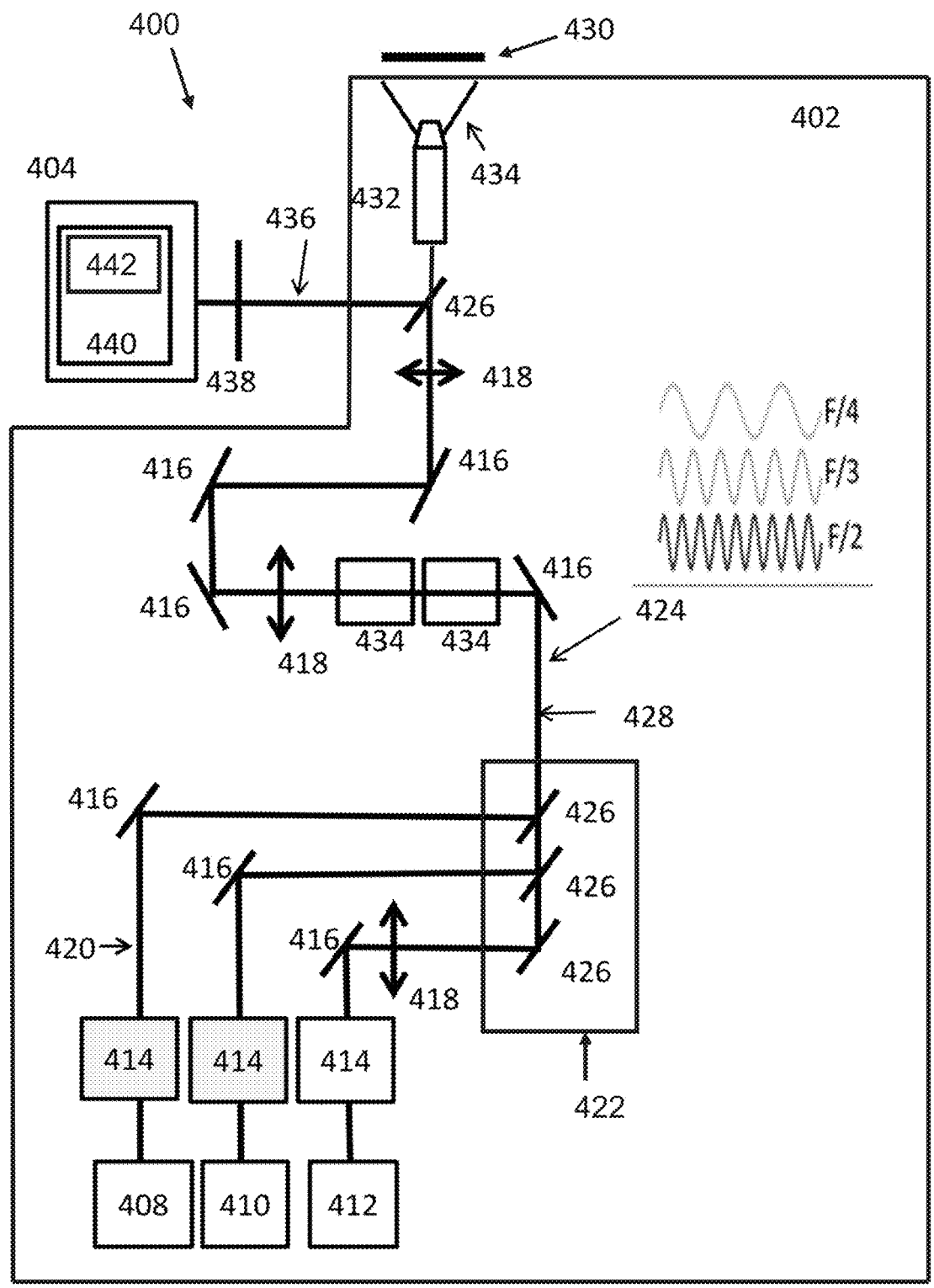
FIG. 4a and FIG. 4b illustrate an experimental imaging device for simultaneous multi-color imaging according to one or more embodiments of the disclosure and its variants.
Figure 4B:
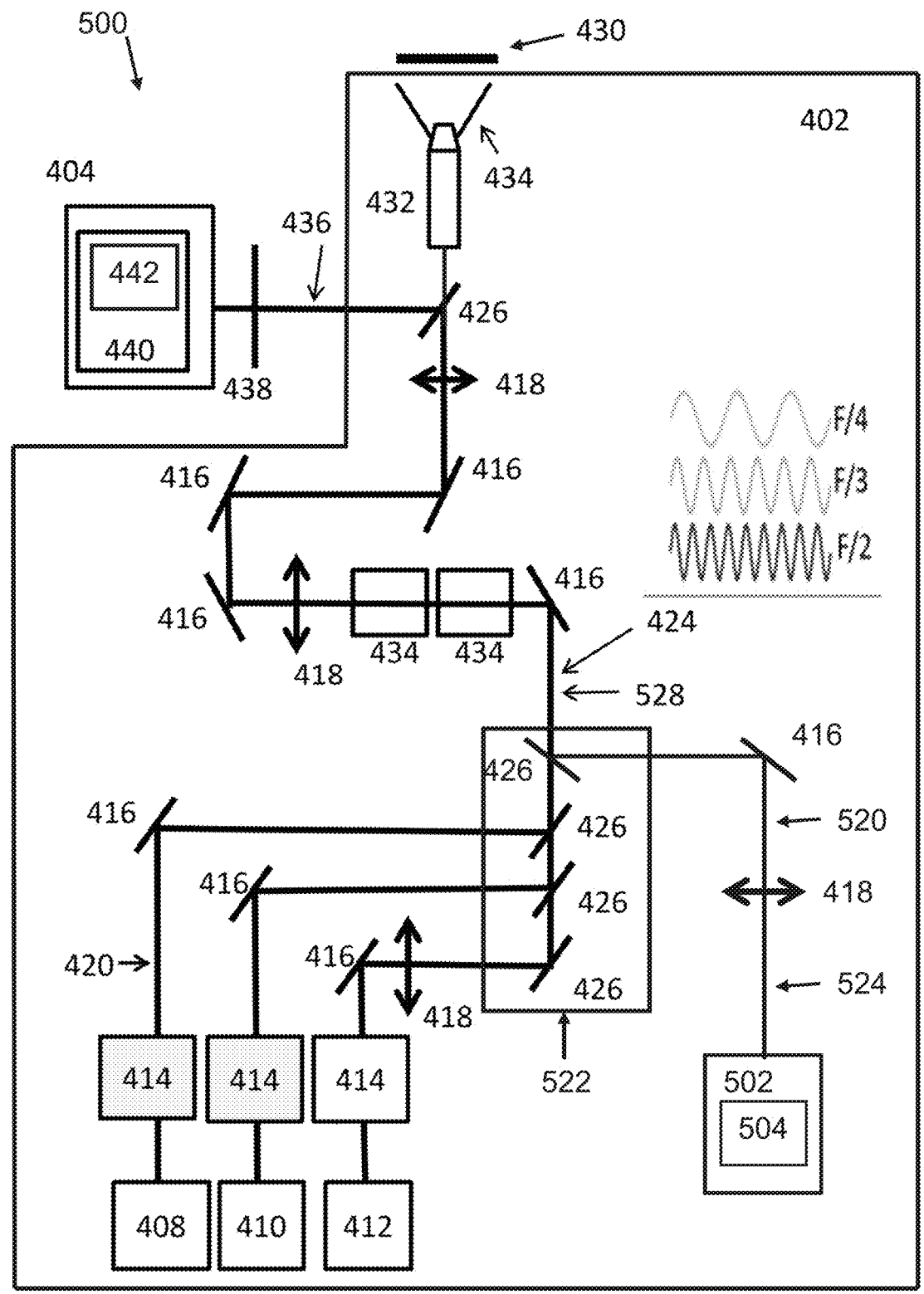

FIGS. 4a and 4b illustrate an experimental imaging device for simultaneous multi-color super-resolution imaging according to an embodiment of the disclosure and its variant respectively.

The imaging device 400 of FIG. 4a for simultaneous multi-color super-resolution imaging using frequency-modulated illumination applied to single-molecule localization microscopy techniques comprises a target illumination system 402 and a sensing system 404.

The target illumination system 402 comprises electromagnetic radiation comprising a plurality of wavelengths. The electromagnetic radiation comprising a plurality of wavelengths is provided by a plurality of electromagnetic radiation sources, each electromagnetic radiation source having a different wavelength. In the embodiment shown in FIG. 4a, the plurality of different electromagnetic radiation sources comprises three different electromagnetic radiation sources 408, 410, 412, but more or less different electromagnetic radiation sources can be used. The electromagnetic radiation sources 408, 410, 412 can be a light source, such as a CW laser, a pulsed laser or any other light source.

In a variant of the embodiment, a single electromagnetic radiation source 408 providing electromagnetic radiation with a plurality of different wavelengths can be used. For example, the electromagnetic radiation source 408 can be a single laser source with a broadband distribution of wavelengths.

The target illumination system 402 further comprises a modulation means 414 to modulate the electromagnetic radiation emitted from the different electromagnetic radiation sources 408, 410, 412 at different wavelengths, with different modulation frequencies each. The modulation means 414 can be a plurality of acousto-optic modulators (AGMs) 414. The plurality of AOMs 414 is placed in the illumination system 402, so that each wavelength of electromagnetic radiation emitted from the electromagnetic radiation sources 408, 410, 412 goes through a single AOM 414. Thus, each wavelength of the plurality of wavelengths of electromagnetic radiation has its individual AOM 414. In FIG. 4a, the modulation means 414 provides three different frequency-modulated wavelength of light.

The plurality of acousto-optic modulators (AOM) 414 enables to modulate independently the intensity of the different wavelengths of electromagnetic radiation at distinct frequencies. Thus, the illumination system 402 provides a frequency multiplexing illumination, in particular a frequency multiplexing excitation, and works in the frequency domain, in contrast to state of the art fluorescence technique where the illumination, in particular the excitation, works in the time domain.

In a variant of the embodiment, the modulation means 414 can be a single modulator device for the plurality of different wavelengths of electromagnetic radiation emitted from the electromagnetic radiation sources 408, 410, 412, which can modulate simultaneously the plurality of different wavelengths of electromagnetic radiation. For example, a wheel with Neutral Density filters and/or a common Acousto-Optic Tunable Filter (AOTF) that can modulate different wavelengths at different frequencies and/or a Spatial Light Modulator (SLM) can be used. Any other device enabling the modulation of the different wavelengths of electromagnetic radiation can also be used as modulation means 414 in the modulation system 402. The modulation means can modulate dependently or independently the different wavelengths of electromagnetic radiation.

In a variant, the plurality of wavelengths of electromagnetic radiation can also be modulated directly at the electromagnetic radiation source. For example, at the laser head when the electromagnetic radiation source is a laser head. No additional element is required to modulate the plurality of wavelengths of electromagnetic radiation, as the electromagnetic radiation sources are modulated electromagnetic radiation sources.

In a variant of the embodiment, not all the wavelengths of electromagnetic radiation are modulated. One or more wavelength(s) can be un-modulated.

The illumination system 402 can also comprise various optical elements, such as mirrors 416 or lenses 418 or any other type of optical elements in the optical path 420 of the electromagnetic radiation of the plurality of electromagnetic radiation sources 408, 410, 412. Such optical elements can be placed between the electromagnetic radiation sources 408, 410, 412 and its individual AOMs 414 or after each AOM 414. Each optical path 420 of electromagnetic radiation emitted from an electromagnetic radiation source 408, 410, 412 can be similar, with the same amount and the same optical elements or it can be different.

The imaging device 400 further comprises an electromagnetic radiation combining means 422, to combine the different wavelengths of electromagnetic radiation emitted by the electromagnetic sources 408, 410, 412 in order to form one optical path 428. Each modulated wavelength of electromagnetic radiation enters the electromagnetic radiation combining means 422 and a combination of these different frequency-modulated wavelengths of electromagnetic radiation will exit the electromagnetic radiation combining means 422 as frequency multiplexed electromagnetic radiation 424. In order to combine the different wavelengths of electromagnetic radiation emitted from all the electromagnetic radiations sources 408, 410, 412 present in the imaging device 400, the electromagnetic radiation combining means 422 comprises various optical elements, in particular dichroic mirrors 426. The dichroic mirrors 426 are placed in the optical path 420 of each electromagnetic radiation sources 408, 410, 412 so as to obtain one unique optical path 428 exiting the electromagnetic radiation combining means 422.

In the variant of the embodiment, where not all the wavelengths of electromagnetic radiation are modulated and thus one or more wavelength(s) can be un-modulated, the electromagnetic radiation combining means 422 will combine all the wavelengths of electromagnetic radiation, the modulated and the un-modulated one to obtain a single optical path 428 for the modulated and un-modulated wavelengths of electromagnetic radiation.

The optical path 428 of the frequency multiplexed electromagnetic radiation 424 of the illumination system 402 can comprise various optical elements such as lenses 418, beam expanders 434, mirrors 416, dichroic mirrors 426. Any other optical elements can be positioned on the optical path 428 in order to have an appropriate illumination of the target 430 by the electromagnetic radiation 424.

The frequency multiplexed electromagnetic radiation 424 enables a simultaneous illumination of the target 430 by the plurality of wavelengths of electromagnetic radiation. In particular, the target 430 is simultaneously excited by the plurality of wavelengths of electromagnetic radiation, in particular wavelengths of light.

The illumination system 402 further comprises a microscope objective 432 and an illumination area 434. The microscope objective 432 and the illumination area 434 are positioned below a target 430. The illumination area 434 of the target 430 is a wide-field illumination 434 as a large region of interest of the target 430 can be illuminated, for example at least 80×80 µm$^2$, in particular 100×100 µm$^2$. The illumination area 434 on the target 430 is defined by the microscope objective 432. The illumination system 402 is configured as an epi-illumination, where the target is illuminated and the electromagnetic radiation emitted from the target is collected through the same objective 432 used for the illumination. The illumination system 402 can also be configured as total internal reflexion illumination (TIRF). The electromagnetic radiation generated by the target 430 upon illumination by the frequency multiplexed electromagnetic radiation 424, in particular the fluorescence emission generated by the target 430, is collected by the same microscope objective 432 and sent to a dichroic mirror 426. The dichroic mirror 426 directs the electromagnetic radiation emitted by the target 430 out from the illumination system 402 toward the sensing system 404. In particular, the electromagnetic radiation emitted by the target 430 corresponds to the fluorescence emission of the target 430, upon excitation by the plurality of modulated wavelengths of electromagnetic beam 424. In this case, the frequency multiplexed electromagnetic radiation 424 corresponds to frequency multiplexed excitation.

In a variant of the embodiment, the illumination system 402 can also be configured to be a highly inclined (HiLo) illumination. The highly inclined illumination (HiLo) is achieved by using a lens before the objective, the angle of the laser beam can be tilted to achieve higher signal to noise because only the portion of the target of interest which needs to be visualized is illuminated.

In a variant, the illumination system 402 can also be positioned above the target 430 or at an angle to the target 430.

In a variant of the illumination system 402, two objectives may be used, one for illumination and one for collecting the fluorescence signal emitted from the target 430, for an excitation light sheet illumination geometry.

The target 430 comprises a plurality of different fluorescence elements. The different fluorescence elements can be spatially and spectrally overlapping. Thus, a wider range of targets 430 can be imaged using the imaging device 400 compared to standard microscopy imaging techniques. In a variant of the embodiment, the different fluorescence elements can be spatially and spectrally separated. A wide range of fluorescence elements can be used, such as fluorescent proteins, small fluorescent dyes, and quantum dots.

The frequency-modulated wavelengths of the excitation light 424 will act as an excitation light source for the target. The target 430 illuminated by the frequency-modulated wavelengths of the excitation light 424 will emit fluorescence 436 proportionally to the product of the local excitation intensity and the absorption cross-sections at each wavelength of excitation. The electromagnetic radiation emitted by the target 430 can also be luminescence, and can also be phosphoresence.

The electromagnetic radiation 436 exiting the illumination system 402 corresponds to the electromagnetic radiation emitted from the target 430 collected by the microscope objective 432, in particular it corresponds to the fluorescence emission of the target 430. It is then directed by the dichroic mirror 426 towards the sensing system 404. The electromagnetic radiation 436 goes through a set of notch filters 438, before entering the sensing system 404. The notch filters 438 enable to reject the wavelengths of the electromagnetic radiation used for illumination. No further spectral filtering is required on the optical path to the sensing system 404 as is required for standard fluorescence techniques. This enables to have an absolute maximal signal throughput to the sensing system 404.

In a variant of the embodiment, further optical elements can be located on the path of the electromagnetic radiation 436 before it enters the sensing system 404, such as lenses 418.

The sensing system 404 is configured to be a wide-field sensing system, such that all the electromagnetic radiation 436 emitted by the target 430 and collected by the microscope objective 432 of the illumination system 402 is sent to the sensing system 404.

The sensing system 404 comprises a sensing device 440. The sensing device 440 is a single sensing device 440. The sensing device 440 can be a charge-coupled device (CCD) camera or a scientific complementary metal-oxide-semiconductor (sCMOS) camera, or any other type of camera or sensing device capable to sense single molecule signal.

The sensing device 440 of the sensing system 404 is configured as a color-blind electromagnetic sensing means 440 and/or devoid of any color filtering means. The color-blind electromagnetic sensing means 440 senses electromagnetic radiation representing the emitted electromagnetic radiation 436 of the target 430 to be studied, in particular fluorescence emission. The color-blind electromagnetic sensing means 440 senses the output photons coming from the target 430 through the microscope objective 432 and associates a value to each pixel in ADU (analog to digital units), in proportion to the number of photons sensed, but not measuring or distinguishing between different wavelengths ("colors"). Thus, the electromagnetic sensing means 440 will sense simultaneously all photons from a wide range of wavelengths equally and indistinctly.

The image acquisition time of the sensing device 440 depends on the sensing device frame rate and the time needed to collect a sufficient number of localizations to satisfy the Nyquist criterion for high image resolution. The Nyquist criterion refers to the number of single molecule localizations that need to be detected in order to re-construct a super-resolution image that faithfully represents the target 430 to be imaged. This is because a super-resolution image is generated by localizing the position of thousands of individual molecules on the target 430. If there are only a few molecules present, then the image would consist only of a few points, i.e. it is under-sampled.

The sensing device 440 performs multiple measurements of the m consecutive frames, in particular a range of 4 up to 300 000 measurements can be performed, in a given frame rate F of the sensing device 440. The frequency information can be obtained in the timeframe of a single exposure frame of conventional multi-color super--resolution techniques.

The sensing device 440 and the modulation means 414 are actually synchronized to have a simultaneous modulation and sensing of electromagnetic radiation.

The single sensing device 440 is being configured to detect simultaneously a plurality of colors. The field of view of the sensing system 404 is thus not compromised and comprises the whole field of view possible of the target 430. In contrast, in standard multi-color super-resolution techniques, for a simultaneous detection of a plurality of colors, the sensing device field of view is split in parts, each part detecting one particular color. This is realised with dichroic mirrors which split the sensed signal into multiple paths corresponding to different wavelengths, so that different colors are separated before reaching the sensing device. This complicates the optical configuration and compromises the size of the field of view. Thus, in standard multi-color super-resolution techniques, the effective field of view is reduced, i.e. the region of the target that is imaged is reduced, i.e. the more colors, the smaller field of view. In order to preserve the full field of view, but image multiple colors at a time, separate detectors are required, each detector imaging one color. This approach is quite difficult to incorporate into the optical system and increases the cost of set-up. Another approach for the standard multi-color super-resolution techniques is to work sequentially, imaging one color at a time, which is highly time consuming.

Thus, the sensing system 404 of the imaging device 400 results in a simpler configuration with reduced costs and reduced acquisition time as well as an increase in field of view and in throughput signal compared to standard multi-color super-resolution techniques.

In a variant, the sensing system 404 can also comprise a cylindrical lens or any other type of lens enabling 3D imaging or a spatial light modulator, placed in front of the sensing device 440, or can also comprise a bi-plane approach.

The electromagnetic sensing means 440 comprises further a processing means 442 to analyze the intensity of the electromagnetic radiation 436 emitted by the target 430 and sensed by the sensing means 440, independently of the wavelength of electromagnetic radiation. An image of the fluorescence elements based on the sensed electromagnetic radiation is realized for each frame of the sensing device 440 independently of wavelength. The intensity evolution of the pixel within a given frame window m is then performed, independently of the modulated wavelength of electromagnetic radiation. The processing means 442 may be a controller including processing circuitry that executes stored program logic and may be any one of a different computers, processors, controllers, or combination thereof that are available for and compatible with the various types of equipment and devices used in the sensing device 440. The different processing steps, including analyzing the intensity of the electromagnetic radiation 436 emitted by the target 430 and sensed by the sensing means 440, demodulating the signal detected by the sensing means, localizing individual fluorescence elements in the target 430, reconstructing an image of the target 430, and color cross-talk correction, performed by the processing means 442, may be provided by one or more sets of instructions stored in non-transitory memory of the processor. Information may also be stored in one or more non-transitory memories of the processing means 442 for later retrieval and use.

In order to retrieve the magnitude of the signal of individual fluorescence element, the signal detected by the sensing means 440 is demodulated. To carry out the demodulation, the intensity evolution of the pixel within a given frame window m was transformed to the frequency domain using a one dimensional Discrete Fourier Transform (DFT). For a given demodulation frame window, m, the DFT generates m/2 frequency bins and therefore m/2 available color-channels. For more colors, higher demodulation frame window sizes can be used.

The processing means 442 is also configured to localize individual fluorescence elements in the target 430. The localization of the individual fluorescence elements comprises localizing the spatial coordinates of individual fluorescence elements. The localization of the individual fluorescence elements can be performed after the demodulation step in the multiple color channels and a color can be assigned to each localization accordingly. The fluorescence emitting elements classification is performed based on the illumination electromagnetic radiation frequency used for illumination for each channel.

In a variant, the localization can also be done before the demodulation.

The processing means 442 is also configured to reconstruct an image of the target 430 to be imaged based on the number of single fluorescence elements localizations. A super-resolution image with high resolution, or high image resolution, can be constructed. A high image resolution corresponds to 10-30 nm.

In a variant of the embodiment, the sensing system 404 can also be configured to perform color cross-talk correction, using simple cross-talk correction algorithm, to reduce the amount of color cross-talk in the detected signal. The cross-talk correction can be performed by the processing means 442 of the sensing device 440.

In a variant of the embodiment, the sensing system 404 can have more than one sensing device 440. The addition of a second sensing device can provide multidimensional single-molecule data in which spatial coordinates, intensity, polarization and spectral discrimination can be obtained in a single measurement. For example, another sensing device could give information on polarization-resolved multi-color measurements, when a polarizing beam splitter cube is installed instead of a dichroic mirror to direct part of the electromagnetic radiation emitted from the target to the second sensing device.

In a variant of the embodiment, the processing means 442 is separate from the sensing device 440. In that case, the sensing device 440 only senses the electromagnetic radiation 436 emitted from the target 430, without processing. The processing means 442 can be a processing system such as a computer. The processing means 442 receives the sensed electromagnetic radiation from the sensing device 440 and performs the analysis of the sensed electromagnetic radiation, the demodulation, the localization and the reconstruction of the image based on the sensed electromagnetic radiation received from the sensing device 440. In another variant, the processing means 442 is separate from the sensing system 404. It can be a remote processing system.

The imaging device 400 works as follows. The imaging device provides electromagnetic radiation at different wavelengths. The different wavelengths of electromagnetic radiation are then modulated with different modulation frequencies each and are combined to illuminate simultaneously a target. The target comprises a plurality of different fluorescence emitting elements. The electromagnetic radiation emitted from the target in response to the simultaneous illumination by the plurality of modulated wavelengths of electromagnetic radiation is sensed by a sensing system. The sensing system senses the electromagnetic radiation emitted from the target, thus of the electromagnetic radiation response of the plurality of fluorescence emitting elements, independently of the modulated wavelengths of electromagnetic radiation, thus of the fluorescence emission from the target upon excitation by the modulated wavelengths of light. A processing system analyses the sensed electromagnetic radiation independently of the modulated wavelength of electromagnetic radiation to reconstruct a super-resolution image of the fluorescence emitting elements in the target. The processing system comprises a demodulation of the sensed electromagnetic radiation in order to identify the individual contributions of the different wavelengths to the intensity of the sensed electromagnetic radiation. The wavelength of electromagnetic radiation, and thus color, is identified based on the different modulation frequencies. The processing system further performs a localization of individual fluorescence elements and based on these localizations, reconstruct the super resolution image of the plurality of fluorescence elements in the target. A further cross talk correction can be performed to increase the correct localizations of the fluorescence elements.

In a variant of the embodiment, as shown in FIG. 4b, the imaging device 500 further comprises an activation means 502 comprising an un-modulated electromagnetic radiation source 504. The same reference numbers as in FIG. 4a will be used to refer to the same features and will not be explained again in detail.

The un-modulated light source 504 can be used for re-activation of the fluorescence elements and not for the excitation of the fluorescence elements and thus for their fluorescence. The un-modulated light source 504 will facilitate the fluorescence elements coming back to the "bright" state and will be used continuously, so it does not need to be modulated like the other electromagnetic radiation sources 408, 410, 412.

In another variant, more than one electromagnetic radiation source can be present in the activation system 502. The other electromagnetic radiation sources of the activation system 502 are also un-modulated.

The imaging device 500 of FIG. 4b also comprises an electromagnetic radiation combining means 522, like the electromagnetic radiation combining means 422 in FIG. 4a, to combine the different wavelengths of electromagnetic radiation emitted by all the different sources 408, 410, 412, 504 present in the imaging device 500.

The electromagnetic radiation combining means 522 combine the optical electromagnetic radiations paths 420, 520 of the plurality of electromagnetic radiation sources 408, 410, 412, 504 present in the imaging device 500 in order to have one optical path 528. In order to combine the plurality of wavelengths of electromagnetic radiation emitted from all the electromagnetic radiations sources 408, 410, 412, 504 present in the imaging device 500, the electromagnetic radiation combining means 522 comprises various optical elements, in particular dichroic mirrors 426. The dichroic mirrors 426 are placed in the optical path 420, 520 of each wavelength of electromagnetic radiation so as to obtain one unique optical path 528 exiting the electromagnetic radiation combining means 522.

The electromagnetic radiation combining means 522 of the illumination system 402 enables a simultaneous illumination of the target 430 by the plurality of modulated wavelength of electromagnetic radiation 424, and the un-modulated activation electromagnetic radiation 524 from the electromagnetic beam source 504.

In a variant of the embodiment, a single electromagnetic radiation source 408 providing electromagnetic radiation with a plurality of different wavelengths can be used. For example, the single electromagnetic radiation source 408 can be a single laser source with a broadband distribution of wavelengths.

In a variant of the embodiment, the activation means 502 is part of the single electromagnetic radiation source 408 of the illumination system 402. For example, the activation means 502 can be one wavelength of the plurality of different wavelengths of the single electromagnetic radiation source 408, left un-modulated. The un-modulated wavelength of electromagnetic radiation can be used for re-activation of the fluorescence elements of the target 430 and not for the excitation of the fluorescence elements of the target 430 and thus for their fluorescence. Thus one wavelength of the plurality of different wavelengths of the single electromagnetic source 408 is not modulated.

Thus, the imaging device 400, 500 provides an imaging device with a simple optical configuration, without compromising the field of view and enabling simultaneous multi-color detection with improved acquisition imaging speed and throughput signal compared to multi-color super-resolution imaging techniques.

Figure 5A:
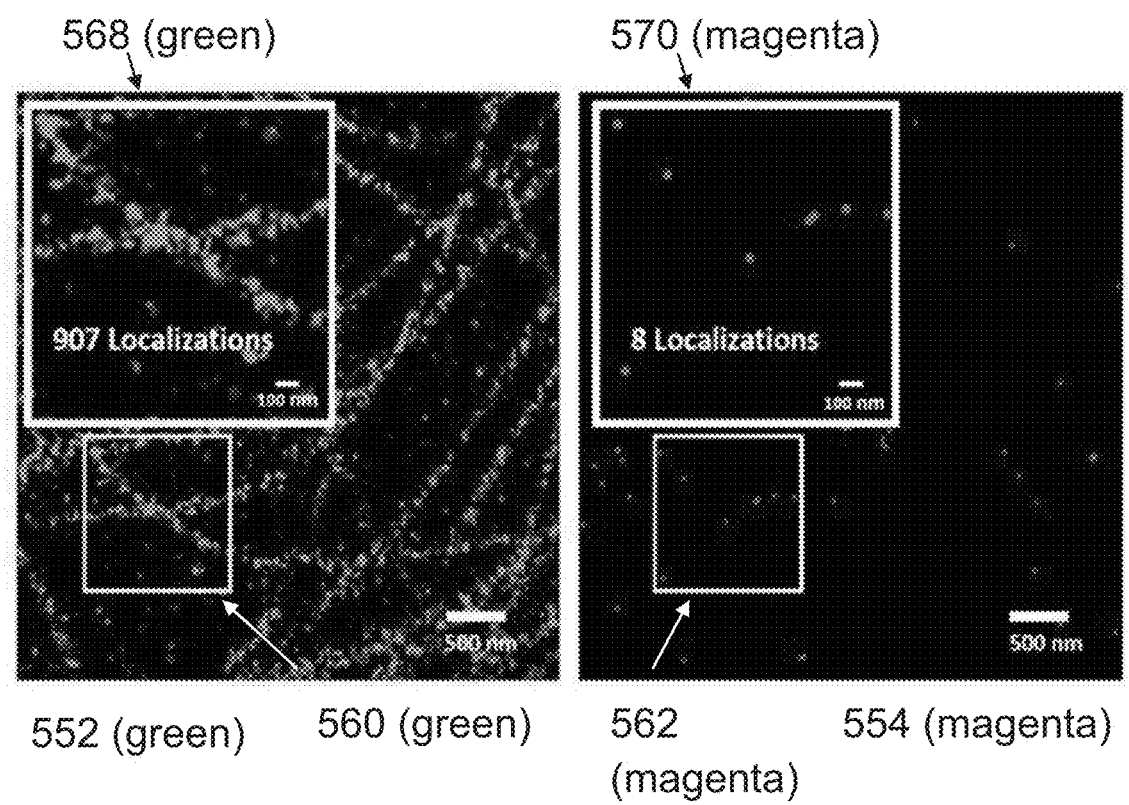
FIG. 5a, FIG. 5b, and FIG. 5c show color cross-talk quantifications in fm-DNA-PAINT, according to a variant of the first embodiment of the disclosure.
Figure 5B:
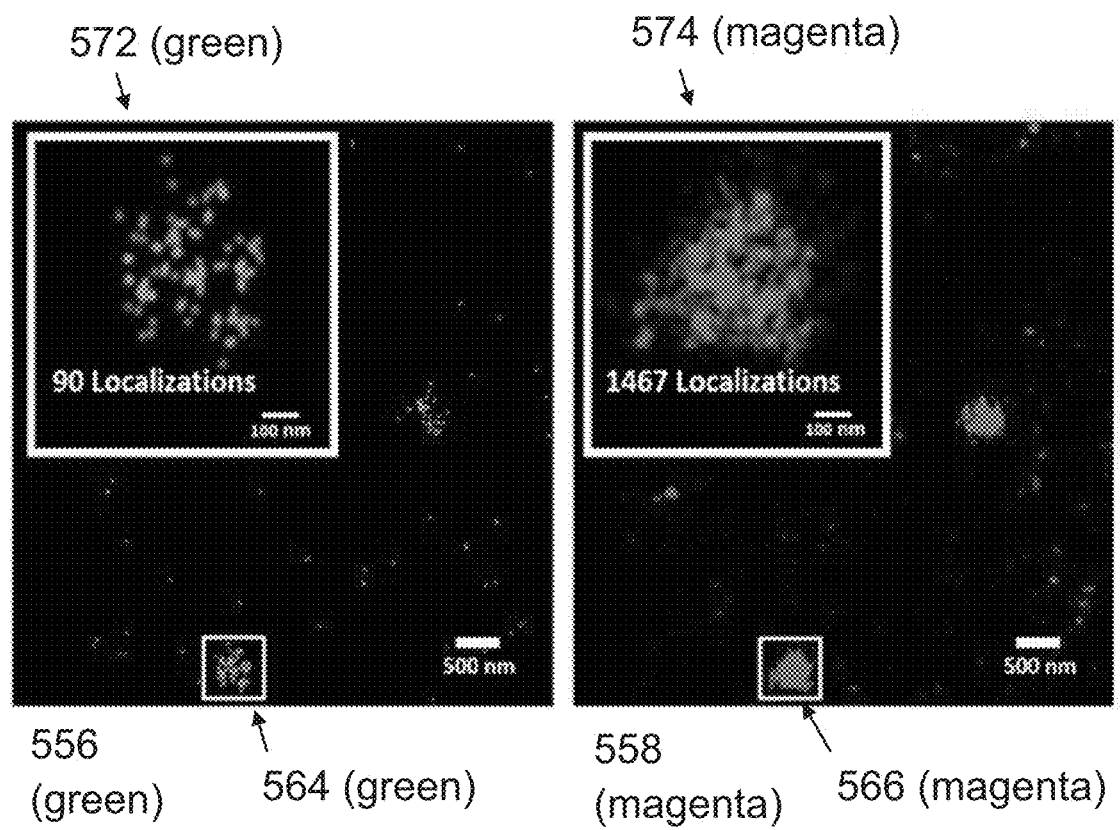
Figure 5C:
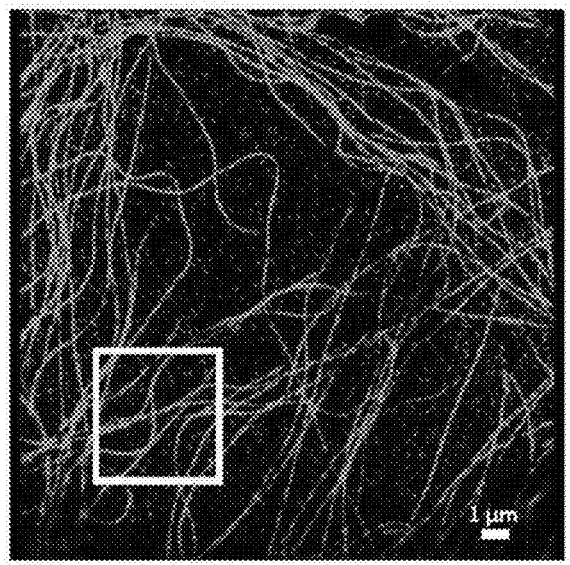
Figure 5C:
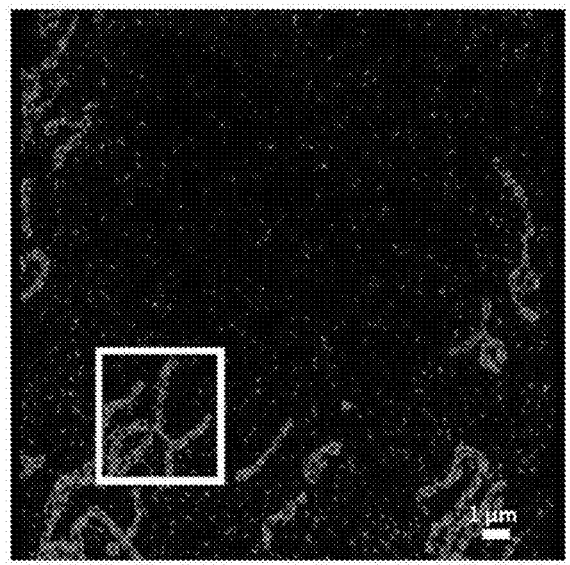
Figure 5C:
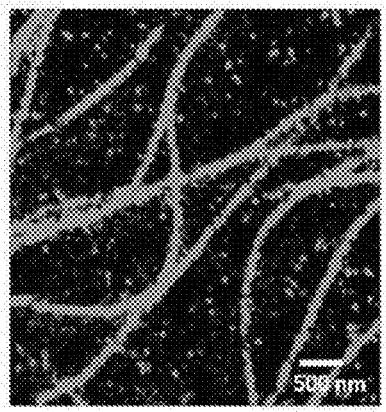
Figure 5C:
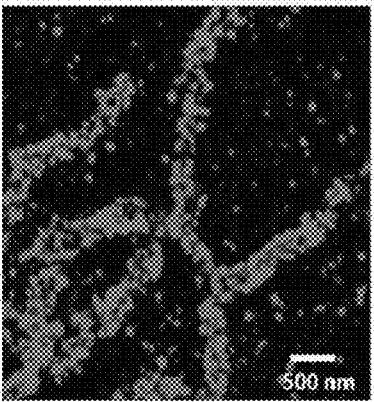
Figure 5C:
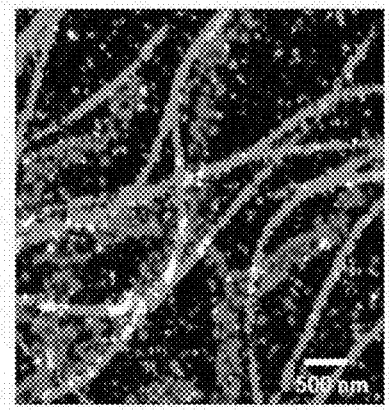

FIGS. 5a to 5c show a practical example of fm-DNA-PAINT according to a variant of the first embodiment of the disclosure. FIGS. 5a and 5b correspond to a practical example of fm-DNA-PAINT without color cross-talk correction, while FIG. 5c corresponds to a practical example of fm-DNA-PAINT with color cross-talk correction.

FIGS. 5a show 2-color 2D images 552 (green), 554 (magenta) of microtubules, using Cy5-equivalent and Cy3-equivalent as fluorophores in image 552 and 554 respectively, and imaged in two colors using fm-DNA-PAINT.

FIGS. 5b shows 2-color 2D images 556 (green), 558 (magenta) of mitochondria, using Cy5-equivalent in image 556 and Cy3-equivalent in image 558 as fluorophores and imaged in two colors using fm-DNA-PAINT.

Images 552-558 show the results before crosstalk correction. The localization images 552 and 556, in green, correspond to the Cy5 channel and the localization images 554 and 558, in magenta, correspond to the Cy3 channel. Localizations in a region of interest 560-566 around the imaged structure were quantified in the two channels as can be seen with the white boxes 560-566 representing the regions of interest and the insets 568-574 corresponding to the zoomed regions of interest 560-566.

The percentage of localizations of microtubules belonging to the Cy5 channel in the region 560 (green) of the image 552 (green) amounts to 907 localizations, while for the Cy3 channel, it amounts to 8 localizations in the region 562 (magenta) of image 554 (magenta), before color cross-talk correction.

The percentage of localizations of mitochondria belonging to the Cy5 channel in the region 564 (green) of the image 556 (green) amounts to 90 localizations, while for the Cy3 channel, it amounts to 1467 localizations in the region 566 (magenta) of image 558 (magenta), before color cross-talk correction.

This corresponds to a correct localization percentage of 97.4% for the Cy5 channel and 96.2% for the Cy3 channel. Thus, a color cross-talk of about 2.6% from Cy3 into Cy5 channel and 3.8% from Cy5 into Cy3 channel can be estimated.

Such values of color cross-talk could be further reduced using a cross-talk correction algorithm.

FIG. 5c shows two-color super-resolution image of microtubules and mitochondria imaged using fm-DNA-PAINT, after crosstalk correction. The image 576 (green) shows microtubules channel only and the image 578 (magenta) shows mitochondria channel only. The image 584 (green) shows a zoom region highlighted with a white box 580, 582 of the microtubules only 584 (green), mitochondria only 586 (magenta) and the overlay of both microtubules and mitochondria 588 (green and magenta).

The values of color cross-talk could be further reduced using a cross-talk correction algorithm. In this particular example, localizations in both color channels were identified if they appeared in the same frame within a distance of 80 nm. The sum of intensity values within a 3×3 pixels sub-region of interest around the center of each of these localizations were computed in the demodulated data and the intensities between both channels were compared. Since the integrated intensity is directly related to the amplitudes of the frequency bins in the frequency domain, this information was used to assign the localization to the correct color channel. Thus, the correct localization of Cy5-equivalent reaches 99.2% and the correct localization for Cy3-equivalent reaches 97.2%, thus reducing the cross-talk value of about 0.8% from Cy3 into Cy5 channel and about 2.8% from Cy5 into Cy3 channel.

Thus, fm-DNA-PAINT is particularly powerful as it is faster than conventional multi-color DNA-PAINT and results in reduced color cross-talk.

Figure 6A:
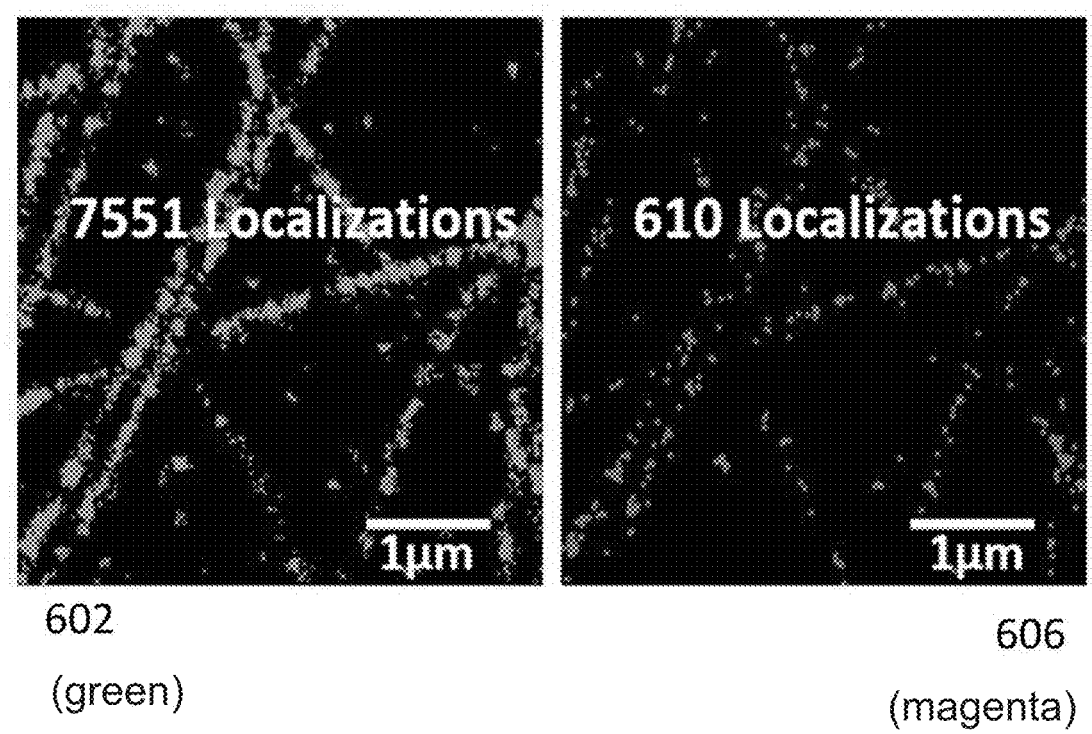
FIG. 6a and FIG. 6b show color cross-talk quantifications in fm-STORM, according to a second variant of the first embodiment of the disclosure.
Figure 6B:
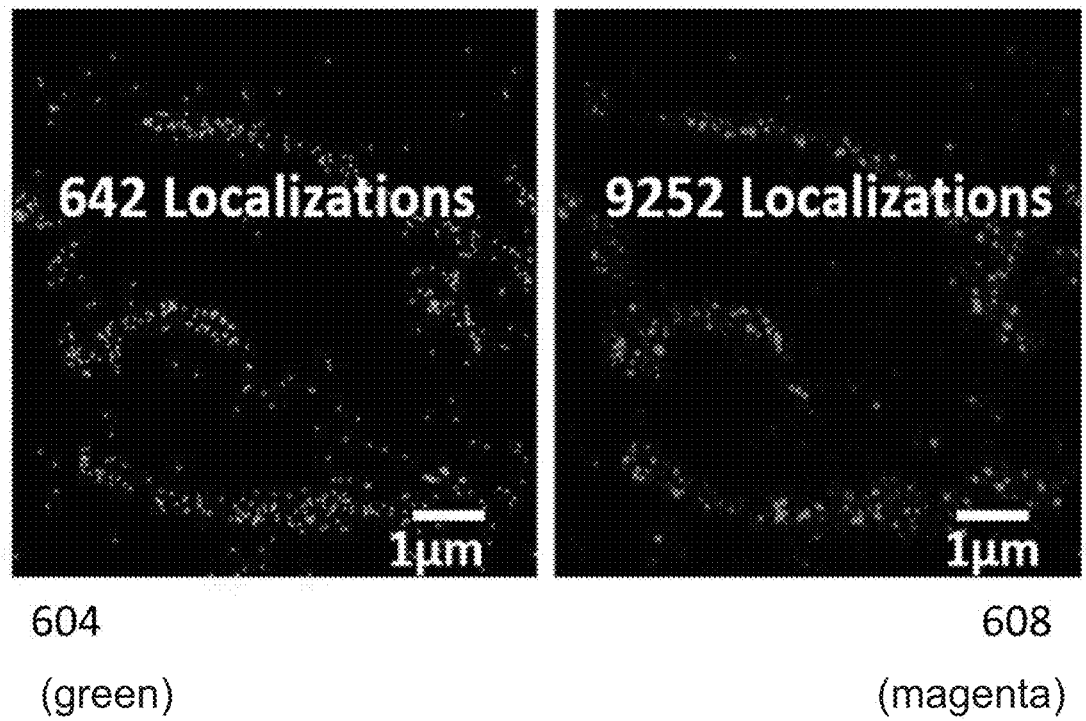

FIGS. 6a to 6b shows a practical example of fm-STORM according to another variant of the first embodiment of the disclosure.

In this variant, the method for multi-color super-resolution imaging according to the disclosure uses frequency-modulated excitation applied to STORM single-molecule localization microscopy, which can be named fm-STORM for frequency-modulated STORM.

Imaging for fm-STORM modality was performed using HiLo illumination with an excitation intensity of ~1.8kW/cm$^2$ for the 561 nm and the 647 nm laser lines and ~1kW/cm$^2$ for the 488 nm one. The highly inclined illumination (HiLo) is achieved by using a lens before the objective, the angle of the laser beam can be tilted to achieve higher signal to noise because only the portion of the sample of interest which needs to be visualized is illuminated. The 405 nm laser line was used in continuous illumination mode for the reactivation of the fluorophore pairs. The 405 nm laser intensity follows a ramp ranging from ~10W/cm$^2$ to ~25W/cm$^2$, in order to maintain a relatively constant density of fluorophores per frame. A camera frame rate of 90 Hz was used for the experiments with a field of view of 128 pixels×128 pixels, which is 20 μm×20 μm. 647 nm and 561 nm lasers were modulated with a sinewave at 45 Hz and 22.5 Hz. For the 3-color data sets, the 647 nm, 561 nm and 488 nm lasers were modulated at 45 Hz, 30 Hz and 15 Hz, respectively.

For fm-STORM, the step of localization is performed before the step of demodulation.

Fluorescent molecules were localized in the raw data using the software Insight3 and performing a Gaussian fitting. Localizations were subsequently classified as single-frame or multi-frame localizations. If a fluorophore that appeared in one frame did not move by more than half a pixel, that is 80 nm, in the subsequent frame, it was taken to be the same fluorophore and classified as multi-frame. A frame window size was chosen for the demodulation, depending on the desired number of channels and imaging conditions. A four frame window size for 2-color imaging and a six frame window size for 3-color imaging were used. A 4×4×m-voxel region around the centroid (x,y,f)→(x,y,f+m) coordinate of a localization is sliced from the background-suppressed camera data. First, the mean intensity value of the sixteen pixels in the sub-region of interest for each raw frame within the frame window were calculated, from which an m-length vector of time-domain data is obtained. On these data, a one dimensional discrete real valued Fourier Transform, which yields (m/2) AC components and 1 DC component in the frequency domain, using the Fast Fourier Transform algorithm (FFT). Lastly, the absolute values from the FFT for the different frequency bins on the frequency domain were calculated and recorded. If the input values are real numbers, it can be called real valued Fourier Transform.

Based on the natural logarithm of these values, the localizations were classified into a specific channel. To perform the channel assignment, decision boundaries were generated by a machine learning algorithm. For this, training data sets from 1-Color experiments are required. Training data sets were acquired using one-color biological samples, which were labeled with the same dyes used for the two-color imaging and imaged in exactly the same way as the two-color samples. The training data was demodulated and the intensities around the localizations corresponding to 4×4 pixel sub-regions of interest were used to define 2D decision boundary regions for those two dyes. The boundary regions were defined using a Support Vector Classification (SVC) of the Python software package. FIGS. 6a and 6b show images of microtubules and lysosomes labeled with AlexaFluor647 (AF647) alone and Cy3b alone, respectively and imaged in two colors using fm-STORM. Images show the two channels before crosstalk correction.

The localizations images 602 (green) and 604 (green) of FIGS. 6a and 6b respectively correspond to the AF647 channel and the localizations images 606 (magenta) and 608 (magenta) of FIGS. 6a and 6b respectively correspond to the Cy3b channel.

The percentage of localizations of microtubules belonging to the AF647 channel in image 602 (green) amounts to 7551 localizations, while for the Cy3b channel, it amounts to 610 localizations in image 606 (magenta), before color cross-talk correction.

The percentage of localizations of lysosomes belonging to the AF647 channel in image 604 (green) amounts to 642 localizations, while for the Cy3b channel, it amounts to 9252 localizations in image 608 (magenta), before color cross-talk correction.

This corresponds to a correct localization percentage of 88% for the AF647 channel and 90% for the Cy3 channel. Thus, a color cross-talk of about 12% from Cy3b into AF647 channel and 10% from AF647 into Cy3b channel can be estimated.

Such values of color cross-talk could be further reduced using a cross-talk correction algorithm. After cross-talk correction, the correct localization of AF647 reaches 95.5% and for Cy3b-equivalent reaches 98.9%, thus corresponding to a cross-talk value of about 1.1% from AF647 into Cy3b channel and about 4.5% cross-talk from Cy3b into AF647 channel.

fm-STORM together with color-cross talk correction enables to reach more than 95% of correct localization of fluorescence targets and enables to reduce color cross-talk compare to standard STORM technique.

For a typical STORM dataset using the activator/reporter approach, where microtubules and mitochondria were labeled with AF405/AF647 and Cy3/AF647 activator-reporter pairs, respectively, the percentage of correct localizations assigned to each channel amounts to 84% and 88% respectively for AF405/AF647 and Cy3B/AF647, after crosstalk correction. Thus, the cross-talk values for STORM after crosstalk correction still amounts to about 16% and 12% for the AF405/AF647 and Cy3B/AF647 channels respectively.

A number of embodiments of the disclosure have been described. Nevertheless, it is understood that various modifications and enhancements may be made without departing the following claims.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the disclosure, including the best mode, and also to enable a person of ordinary skill in the relevant art to practice the disclosure, including making and using any devices or systems and performing any incorporated methods. The patentable scope of the disclosure is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for multi-color imaging using frequency-modulated illumination comprising:
    a step of providing electromagnetic radiation with a plurality of different wavelengths, comprising a step of modulating each wavelength with a different modulation frequency,
    a step of illuminating a target with the modulated electromagnetic radiation,
    a step of activating the target with an unmodulated electromagnetic radiation,
    a step of sensing electromagnetic radiation emitted from the target, and
    a step of processing sensed electromagnetic radiation data obtained in the step of sensing.

2. The method of claim 1, wherein the step of illuminating comprises simultaneously illuminating the target with the plurality of wavelengths of electromagnetic radiation and the un-modulated electromagnetic radiation.

3. The method of claim 1, further comprising a step of filtering the emitted electromagnetic radiation via a notch filter prior to the step of sensing; and wherein the step of sensing comprises sensing an intensity of the electromagnetic radiation emitted by the target independently of a wavelength of the electromagnetic radiation emitted by the target.

4. The method of claim 1, further comprising a step of analyzing an intensity of the electromagnetic radiation emitted by the target independently of a wavelength of the electromagnetic radiation emitted by the target.

5. The method of claim 1, wherein the step of processing comprises a step of demodulating the sensed data to identify individual contributions of the different wavelengths to the intensity of the emitted electromagnetic radiation for each modulation frequency.

6. The method of claim 5, wherein based on the demodulated data, the wavelength of the emitted electromagnetic radiation is identified based on the different modulation frequencies.

7. The method of claim 1, wherein the step of processing further comprises a step of localizing individual fluorescence emitting elements in the target.

8. The method of claim 7, wherein the step of processing comprises reconstructing an image of the fluorescence emitting elements based on the step of localizing.

9. The method of claim 1, wherein the multi-color imaging using the frequency modulated illumination is applied to one or more of single-molecule microscopy, single-molecule localization microscopy, super-resolution microscopy, STORM, PALM, PAINT and DNA-PAINT imaging modalities.

10. The method of claim 1, wherein the step of illuminating the target with modulated electromagnetic radiation comprises excitation of the target, and wherein the step of sensing electromagnetic radiation emitted from the target comprises sensing luminescence or fluorescence.

11. An imaging device for multi-color imaging using frequency-modulated illumination comprising:
    a target illumination system including an electromagnetic radiation source for providing electromagnetic radiation with a plurality of different wavelengths for illuminating a target;
    a sensing system for sensing electromagnetic radiation emitted from the target;
    a modulation device to modulate each wavelength of electromagnetic radiation with a different modulation frequency; and
    a combining device for combining each modulated wavelength to form frequency multiplexed electromagnetic radiation;
    wherein the target is illuminated with the frequency multiplexed electromagnetic radiation; and further comprising an activation device, the activating device providing one or more un-modulated wavelengths of electromagnetic radiation to illuminate the target; wherein the combining device combines the one or more un-modulated wavelengths of electromagnetic radiation with the frequency multiplexed electromagnetic radiation; and wherein the target is simultaneously illuminated by the frequency multiplexed electromagnetic radiation and activated by the one or more un-modulated wavelengths.

12. The imaging device of claim 11, wherein the sensing system comprises a sensing device, the sensing device being a color blind electromagnetic sensing device and/or devoid of any color filters.

13. The imaging device of claim 11, further comprising a processor including instructions in non-transitory memory that when executed cause the processor to analyze the intensity of the sensed electromagnetic radiation independent of a wavelength of electromagnetic radiation.

14. The imaging device of claim 13, wherein the processor further includes instructions that when executed cause the processor to demodulate the sensed electromagnetic radiation to identify contributions attributed to the different wavelengths of electromagnetic radiation based on the different modulation frequencies.

15. The imaging device of claim 13, wherein the processor further includes instructions that when executed cause the processor to localize individual fluorescence elements in the target.

16. Method for multi-color imaging using frequency-modulated illumination comprising:
    a step of providing electromagnetic radiation with a plurality of different wavelengths, comprising a step of modulating one or more wavelengths of the plurality of wavelengths, each wavelength modulated with a different modulation frequency and then adding unmodulated electromagnetic radiation,
    a step of illuminating a target with the modulated electromagnetic radiation as well as the unmodulated electromagnetic radiation,
    a step of sensing electromagnetic radiation emitted from the target, and a step of processing emitted electromagnetic radiation data obtained in the step of sensing.

17. The method of claim 16, wherein each of the plurality of wavelengths are modulated; and wherein each of the plurality of wavelengths of electromagnetic radiation are directly modulated at an illumination source providing the electromagnetic radiation.

18. The method of claim 16, further comprising a step of combining each modulated wavelength in to a frequency multiplexed electromagnetic radiation and then combining the frequency multiplexed electromagnetic radiation with the unmodulated electromagnetic radiation.

19. The method of claim 16, wherein one or more remaining wavelengths are un-modulated; and further comprising, combining all of the one or more modulated wavelengths, the one or more remaining un-modulated wavelengths, and the added unmodulated wavelength in to a single optical path, and simultaneously illuminating the target with the combined wavelengths.

20. The method of claim 16, wherein the step of sensing electromagnetic radiation emitted from the target comprises sensing luminescence or fluorescence.

21. The imaging device of claim 13, wherein the processor further includes instructions that when executed cause the processor to reconstruct an image of the fluorescence emitting elements in the target based on the determined individual fluorescence elements localizations.

* * * * *